(12) United States Patent
Sasakawa et al.

(10) Patent No.: US 10,559,843 B2
(45) Date of Patent: Feb. 11, 2020

(54) NON-AQUEOUS ELECTROLYTE BATTERY, NON-AQUEOUS ELECTROLYTE BATTERY PACK, AND VEHICLE

(71) Applicant: Kabushiki Kaisha Toshiba, Minato-ku (JP)

(72) Inventors: Tetsuya Sasakawa, Yokohama (JP); Kazuomi Yoshima, Yokohama (JP); Yasuhiro Harada, Isehara (JP); Norio Takami, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 200 days.

(21) Appl. No.: 15/392,009

(22) Filed: Dec. 28, 2016

(65) Prior Publication Data
US 2017/0271707 A1 Sep. 21, 2017

(30) Foreign Application Priority Data

Mar. 15, 2016 (JP) .................. 2016-051379

(51) Int. Cl.
*H01M 2/26* (2006.01)
*H01M 2/10* (2006.01)
(Continued)

(52) U.S. Cl.
CPC ..... *H01M 10/0418* (2013.01); *H01M 2/1077* (2013.01); *H01M 2/206* (2013.01);
(Continued)

(58) Field of Classification Search
CPC ......... H01M 10/0418; H01M 10/0525; H01M 10/0585; H01M 10/425; H01M 2/1077; H01M 2/266
See application file for complete search history.

(56) References Cited

U.S. PATENT DOCUMENTS

2004/0038123 A1* 2/2004 Hisamitsu ......... H01M 10/0413
429/147
2005/0132562 A1* 6/2005 Saito ................... H01M 4/0404
29/623.5
(Continued)

FOREIGN PATENT DOCUMENTS

CN 102057522 A 5/2011
CN 103620823 A 3/2014
(Continued)

OTHER PUBLICATIONS

Extended European Search Report dated May 2, 2017 in European Patent Application No. 17154771.4.

*Primary Examiner* — Jonathan G Jelsma
(74) *Attorney, Agent, or Firm* — Oblon, McClelland, Maier & Neustadt, L.L.P.

(57) ABSTRACT

A non-aqueous electrolyte battery includes an electrode group including positive, negative and bipolar electrodes and separators interposed between these electrodes. In the positive electrode, positive electrode active material layers are formed on both side surfaces of a current collector. In the negative electrode, negative electrode active material layers are formed on both side surfaces of a current collector. In the bipolar electrode, positive and negative electrode active material layers are formed on both side surfaces of a current collector respectively. In the group, these electrodes are stacked with the interposed separators. The group includes current collecting tabs for these electrodes. Connecting portions of these tabs are arranged in different positions on an outer periphery of the group.

18 Claims, 11 Drawing Sheets

(51) Int. Cl.
*H01M 10/0525* (2010.01)
*H01M 10/0585* (2010.01)
*H01M 10/04* (2006.01)
*H01M 2/20* (2006.01)
*H01M 10/42* (2006.01)

(52) U.S. Cl.
CPC ....... *H01M 2/266* (2013.01); *H01M 10/0525* (2013.01); *H01M 10/0585* (2013.01); *H01M 10/425* (2013.01); *H01M 2220/20* (2013.01)

(56) References Cited

U.S. PATENT DOCUMENTS

| | | |
|---|---|---|
| 2009/0263709 A1 | 10/2009 | Nakamura |
| 2010/0163325 A1 | 7/2010 | Nakamura |
| 2010/0190047 A1 | 7/2010 | West et al. |
| 2010/0203384 A1 | 8/2010 | West et al. |
| 2010/0273035 A1* | 10/2010 | Kim .................. H01G 9/016 429/82 |
| 2011/0014520 A1 | 1/2011 | Ueda |
| 2011/0183166 A1 | 7/2011 | Suga et al. |
| 2012/0021268 A1 | 1/2012 | Mailley et al. |
| 2013/0011720 A1* | 1/2013 | Clark .................. H01M 2/22 429/160 |
| 2015/0097425 A1* | 4/2015 | Kimura .................. B60K 6/28 307/10.1 |
| 2016/0020481 A1 | 1/2016 | He et al. |

FOREIGN PATENT DOCUMENTS

| | | |
|---|---|---|
| CN | 105009353 B | 5/2017 |
| JP | 2000-100471 | 4/2000 |
| JP | 2005-197015 A | 7/2005 |
| JP | 4300310 | 7/2009 |
| JP | 2009-199912 | 9/2009 |
| JP | 2011-91039 | 5/2011 |
| JP | 4857896 | 1/2012 |
| JP | 2012-516542 | 7/2012 |
| JP | 2012-521624 | 9/2012 |
| JP | 2013-131463 A | 7/2013 |
| JP | 2014-519139 A | 8/2014 |
| WO | WO 2010/010717 A1 | 1/2010 |
| WO | WO 2016/113863 A1 | 7/2016 |

* cited by examiner

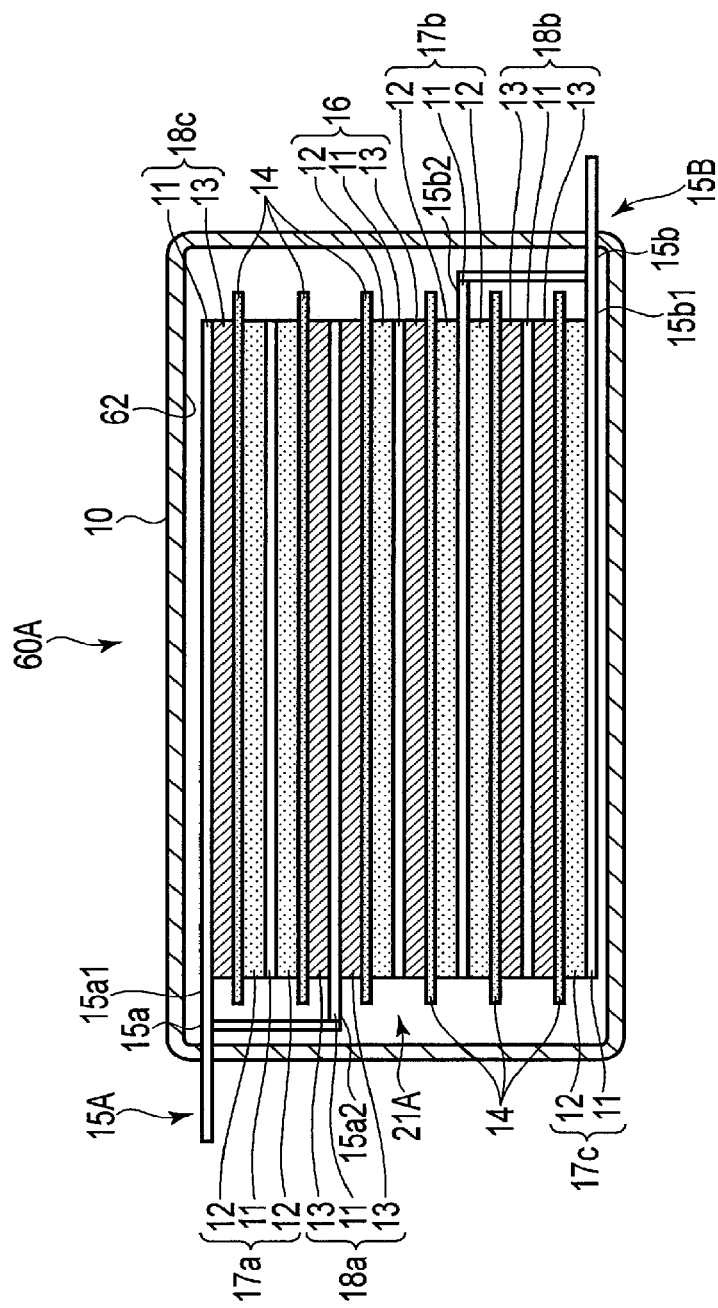
F I G. 1

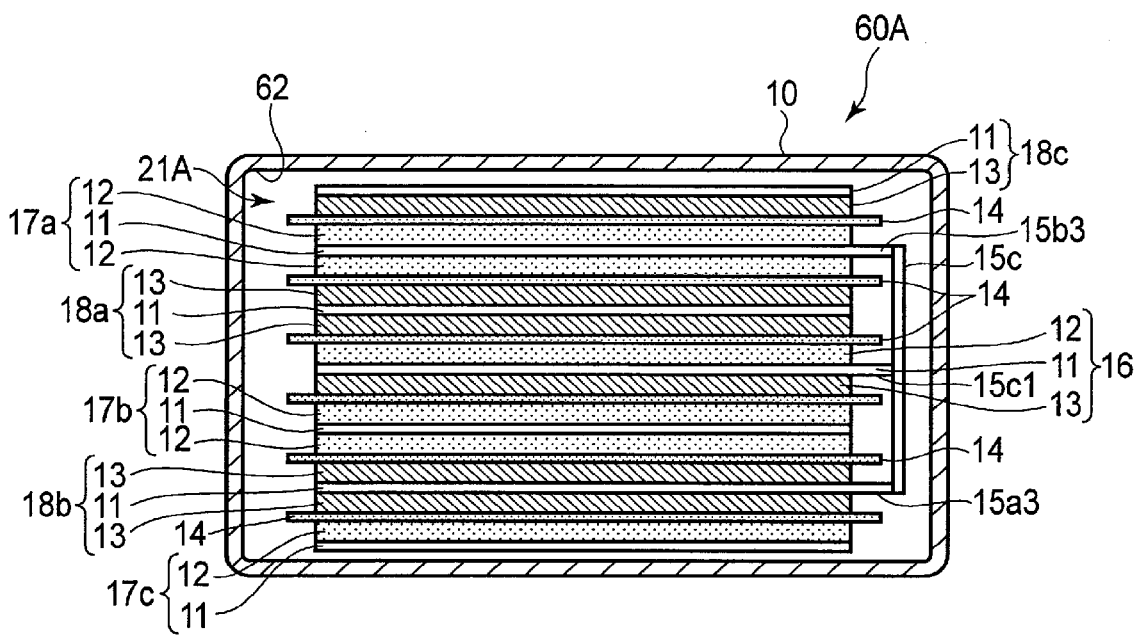
F I G. 2
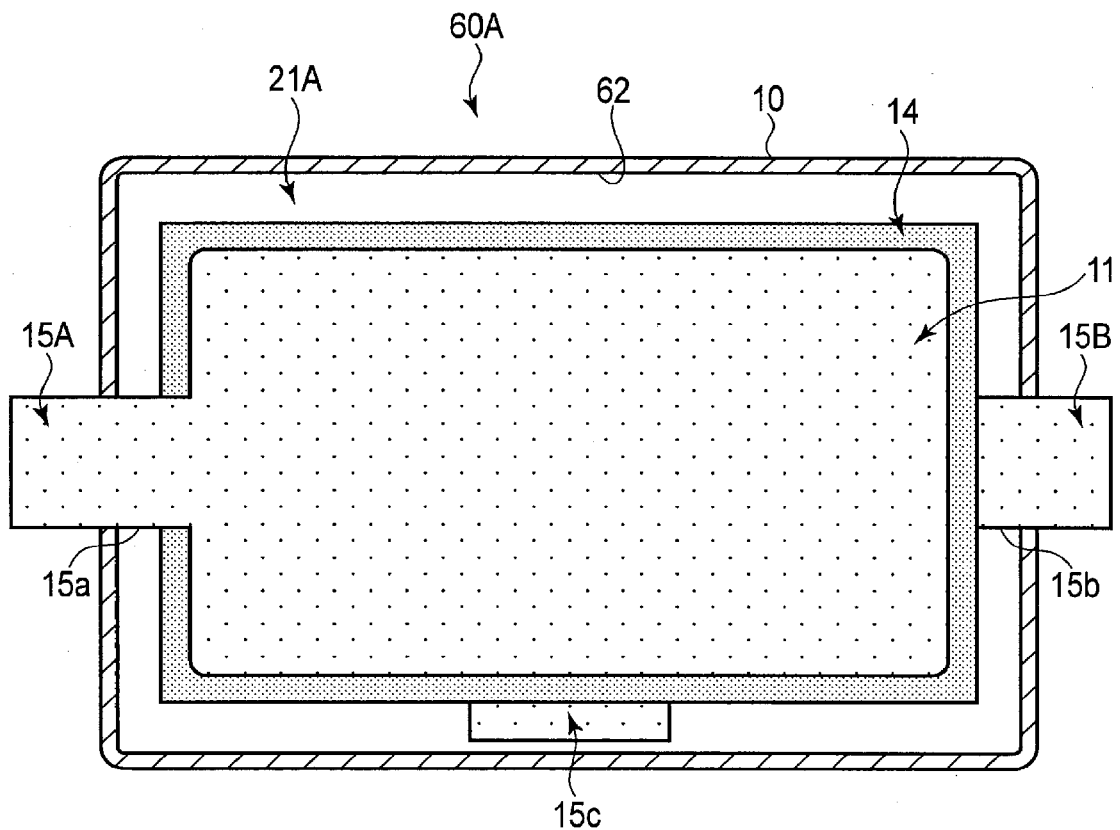
F I G. 3

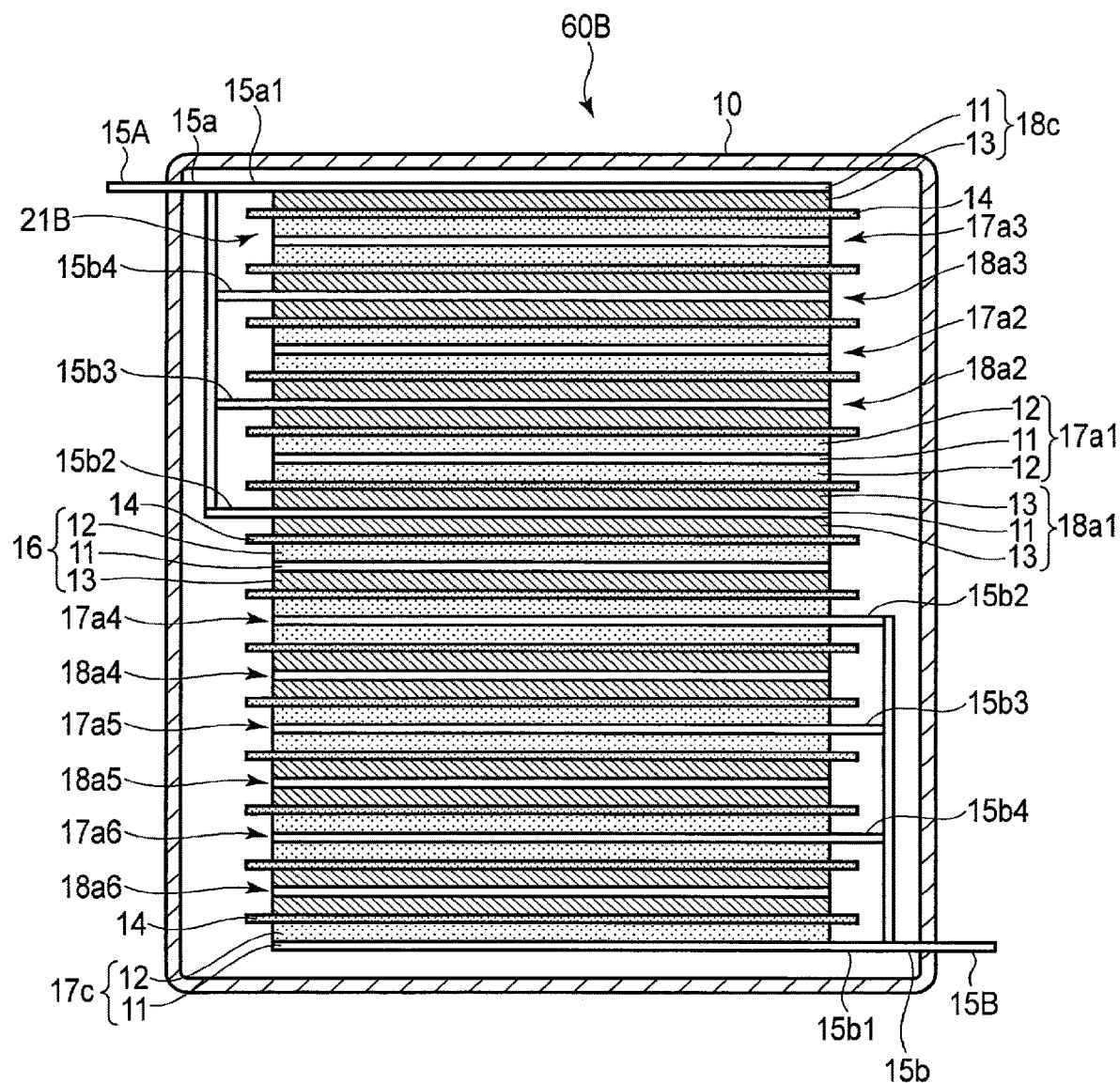
F I G. 5

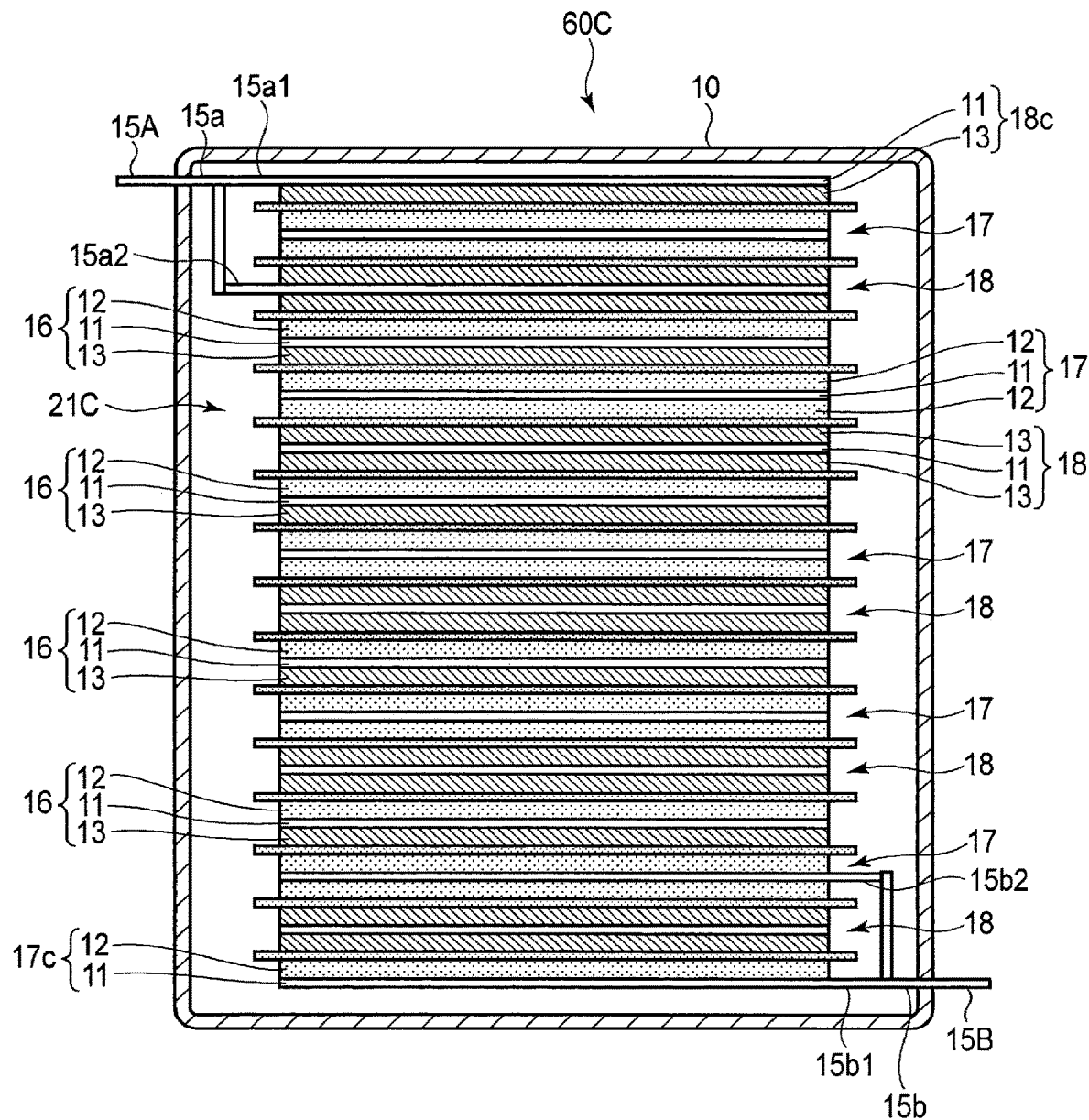
F I G. 7

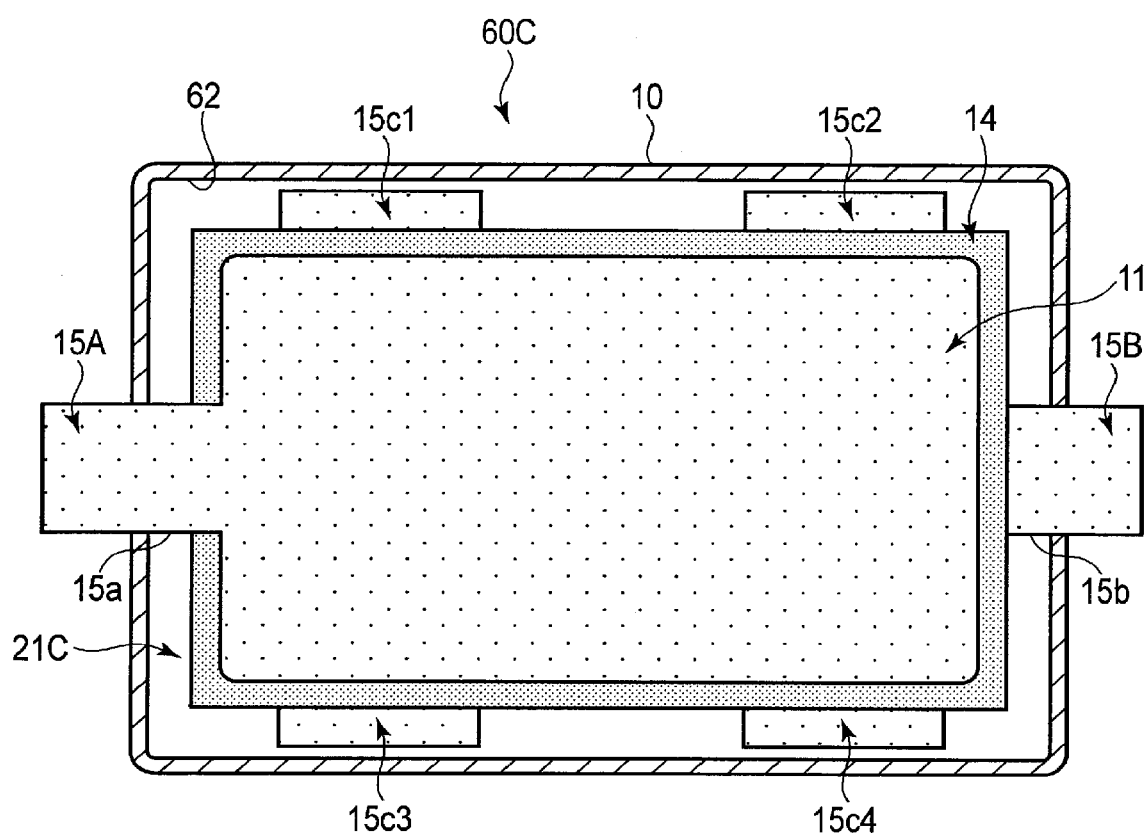
F I G. 8

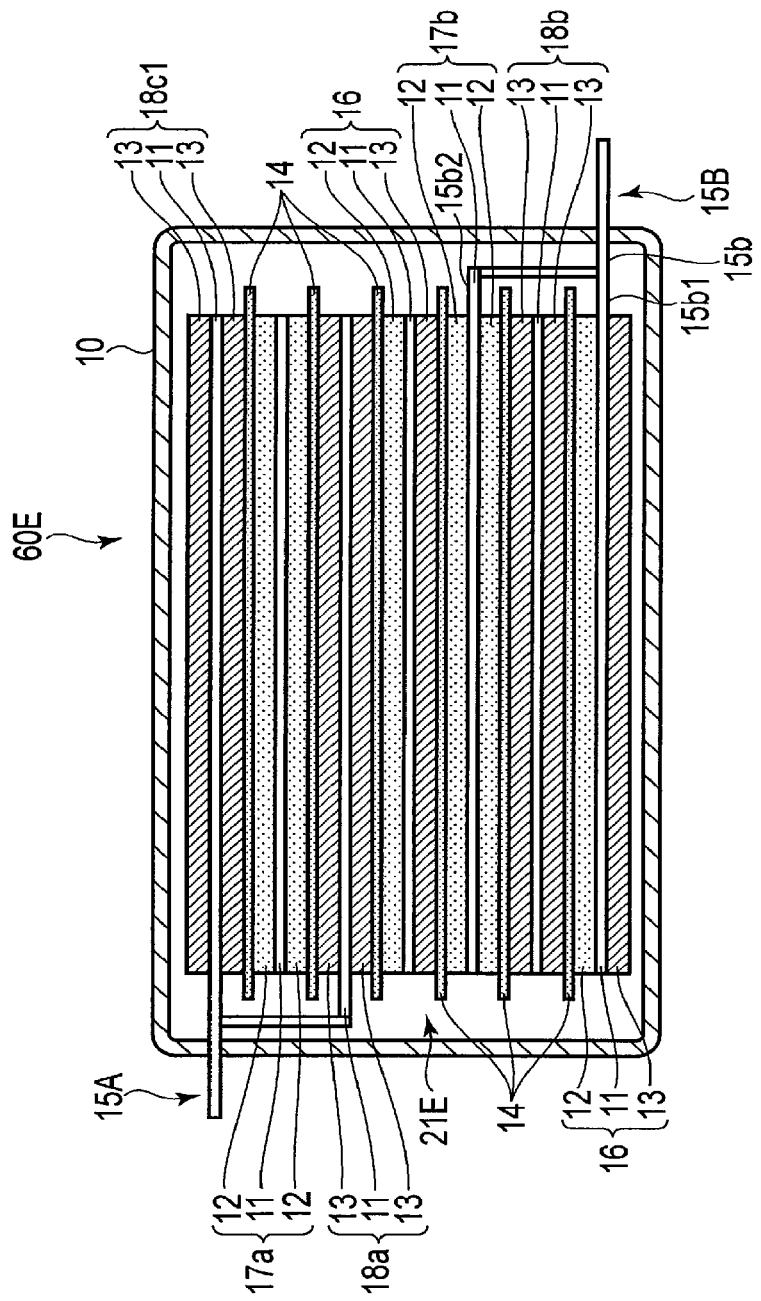
F I G. 10

NON-AQUEOUS ELECTROLYTE BATTERY, NON-AQUEOUS ELECTROLYTE BATTERY PACK, AND VEHICLE

CROSS-REFERENCE TO RELATED APPLICATIONS

This application is based upon and claims the benefit of priority from Japanese Patent Application No. 2016-051379, filed Mar. 15, 2016, the entire contents of which is incorporated herein by reference.

FIELD

Embodiments described herein relates generally to a non-aqueous electrolyte battery, a non-aqueous electrolyte battery pack, and a vehicle.

BACKGROUND

In recent years, research and development of lithium ion secondary batteries is actively conducted as a high energy-density battery. Lithium ion secondary batteries are expected to be used as an electric source of vehicles such as hybrid vehicles and electric vehicles or as an uninterruptible power supply of mobile phone base stations. However, even if a cell of a lithium ion secondary battery is made larger in size, the voltage obtained from the cell of the lithium ion secondary battery is a low voltage of about 3.7 V. Thus, to obtain a high output from a power supply using the cell of the lithium ion secondary battery, a power supply in which many cells of the lithium ion secondary battery are connected in series needs to be used. As a result, a size of the power supply grows becomes larger.

A bipolar battery is proposed as a cell that can be made smaller in size relative to its output. The bipolar battery uses a plurality of bipolar electrodes, each of which includes a current collector, a positive electrode active material layer formed on one side surface of the current collector, and a negative electrode active material layer formed on the other side surface of the current collector. These bipolar electrodes are arranged with an electrolytic layer being interposed between them and electrically connected in series. Since the plural bipolar electrodes are electrically connected in series in the bipolar battery, high power of a high-voltage and constant current can be obtained and further an electric resistance in the battery is small.

A lithium ion secondary battery uses a liquid electrolyte. And, positive electrodes and negative electrodes are repeated in one cell of the bipolar battery. Thus, if the liquid electrolyte used for the lithium ion secondary battery is applied to the bipolar battery, a short-circuit (liquid junction) may be caused by ionic conduction between the positive electrode and the negative electrode. Therefore, a structure of the cell of the lithium ion secondary battery using the liquid electrolyte cannot be adopted as a structure of the cell of the bipolar battery.

Heretofore, a bipolar battery using a polymeric solid electrolyte that does not include a liquid electrolyte has been proposed. Since the bipolar battery with this structure does not use the liquid electrolyte, there is no possibility of the short-circuit (liquid junction) due to the ionic conduction of the liquid electrolyte between the plurality of bipolar electrolytes. In general, however, an ionic conductance of the solid electrolyte is about 1/10 to 1/100 of that of the liquid electrolyte and is very low in comparison with that of the liquid electrolyte. Therefore, an output density of the bipolar battery in this structure is low and the bipolar battery in this structure is not yet in actual use.

In view of the above circumstances, a bipolar battery using a gel electrolyte obtained by making a liquid electrolyte being semisolid is proposed. The gel electrolyte is produced by soaking an electrolytic solution into a polymer such as polyethylene oxide (PEO), polyvinylidene difluoride (PVdF), etc. Since the gel electrolyte has a high ionic conductivity, an output density of a bipolar battery using the gel electrolyte can also be expected to be high.

There remains a problem in increasing a size of the bipolar battery (that is, in realizing a higher energy density of the bipolar battery). As a method for realizing a higher energy density of the bipolar battery, some methods are considered. In one of the methods, electrode areas of positive and negative electrodes are increased. On the other of the methods, bipolar unit cells each having small electrode areas of the positive and negative electrodes are connected in parallel. In a lithium ion secondary battery having a conventional electrode structure, positive and negative electrodes and separators are spirally wound with no space between them and then are accommodated with high density in a battery case, whereby a higher energy density is achieved. However, in the bipolar battery, owing to its structure, the positive electrode and the negative electrode are integrally formed. Therefore, if the positive electrode and the negative electrode are spirally wound, counter electrodes are in contact with each other. Thus, there is a problem that a short-circuit occurs unless, for example, an insulating layer such as a separator or a polymer is sandwiched between bipolar electrode layers.

However, in this case, a thickness of an electrode body is increased by sandwiching the insulating layer such as a separator or a polymer between the bipolar electrode layers, so that a filling rate of an electrode is reduced. Thus, it is difficult to realize the higher energy density with the use of this method. Further, when the electrode areas is enlarged by the spiral winding, it is difficult to take electrode current collecting tabs which are to be connected to a current collecting terminal portion of the battery, from plural portions. For this reason, as the electrode area increases, an internal resistance of the battery increases and interferes with a realization of a higher output in the bipolar battery. Accordingly, it is required to provide a technique by which the above problems in the bipolar battery are solved and simultaneously a high output/input and a high energy density can be achieved in the bipolar battery.

BRIEF DESCRIPTION OF THE DRAWINGS

FIG. 1 is a schematic vertical cross-sectional view of the entire non-aqueous electrolyte battery of a first embodiment;

FIG. 2 is a schematic vertical cross-sectional view of the entire non-aqueous electrolyte battery of the first embodiment in a direction perpendicular to FIG. 1;

FIG. 3 is a schematic horizontal cross-sectional view of the entire non-aqueous electrolyte battery of the first embodiment;

FIG. 5 is a schematic vertical cross-sectional view of the entire non-aqueous electrolyte battery of a second embodiment;

FIG. 7 is a schematic vertical cross-sectional view of the entire non-aqueous electrolyte battery of a third embodiment;

FIG. 8 is a schematic horizontal cross-sectional view of the entire non-aqueous electrolyte battery of the third embodiment;

FIG. 10 is a schematic vertical cross-sectional view of the entire non-aqueous electrolyte battery of a fifth embodiment;

DETAILED DESCRIPTION

Figure 4A:
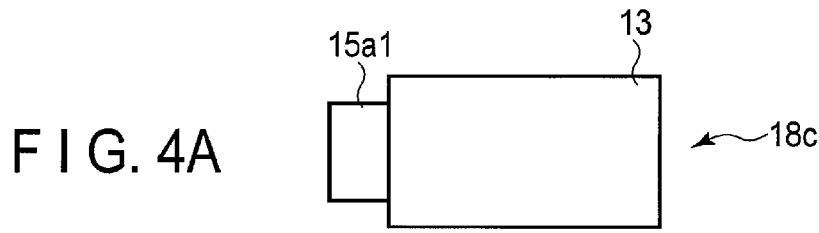
FIG. 4A is a plan view schematically showing a sided negative electrode included in a plurality of electrodes constituting an electrode group of the non-aqueous electrolyte battery of the first embodiment.

A non-aqueous electrolyte battery according to one embodiment comprises an electrode group including at least one positive electrode, at least one negative electrode, at least one bipolar electrode and separators. The positive electrode includes a current collector, including one side surface and the other side surface, and a positive electrode active material layer formed on each of the one side and the other side surfaces of the current collector. The negative electrode includes a current collector, including one side surface and the other side surface, and a negative electrode active material layer formed on each of the one side and the other side surfaces of the current collector. The bipolar electrode includes a current collector, including one side surface and the other side surface, a positive electrode active material layer formed on the one side surface of the current collector, and a negative electrode active material layer formed on the other side surface of the current collector. In the electrode group, the positive electrode, the negative electrode and the bipolar electrode are stacked with the separators interposed between them and constitute an electrode group. The electrode group includes a current collecting tab for the negative electrode, a current collecting tab for the positive electrode and a current collecting tab for the bipolar electrode, each of the current collecting tabs including a connecting portion. The connecting portion of the current collecting tab for the negative electrode, the connecting portion of the current collecting tab for the positive electrode, and the connecting portion of the current collecting tab for the bipolar electrode are arranged in different positions on an outer peripheral part of the electrode group.

A non-aqueous electrolyte battery pack according to one embodiment comprises a plurality of non-aqueous electrolyte batteries, a pair of positive electrode side lead for external connection and negative electrode side lead for external connection, and a protective circuit. The non-aqueous electrolyte batteries are bound together and electrically connected in series, in parallel, or in combination in series and in parallel. The pair of positive electrode side lead and negative electrode side lead is common to the non-aqueous electrolyte batteries. The protective circuit is connected to the non-aqueous electrolyte batteries and is configured to detect an abnormal operation of the non-aqueous electrolyte batteries and to avoid the abnormal operation of the non-aqueous electrolyte batteries. Each of the non-aqueous electrolyte batteries comprises an electrode group including at least one positive electrode, at least one negative electrode, at least one bipolar electrode and separators. The positive electrode includes a current collector, including one side surface and the other side surface, and a positive electrode active material layer formed on each of the one side and the other side surfaces of the current collector. The negative electrode includes a current collector, including one side surface and the other side surface, and a negative electrode active material layer formed on each of the one side and the other side surfaces of the current collector. The bipolar electrode includes a current collector, including one side surface and the other side surface, a positive electrode active material layer formed on the one side surface of the current collector, and a negative electrode active material layer formed on the other side surface of the current collector. In the electrode group, the positive electrode, the negative electrode and the bipolar electrode are stacked with the separators interposed between them and constitute an electrode group. The electrode group includes a current collecting tab for the negative electrode, a current collecting tab for the positive electrode and a current collecting tab for the bipolar electrode, each of the current collecting tabs including a connecting portion. The connecting portion of the current collecting tab for the negative electrode, the connecting portion of the current collecting tab for the positive electrode, and the connecting portion of the current collecting tab for the bipolar electrode, are arranged in different positions on an outer peripheral part of the electrode group.

A vehicle according to one embodiment comprises the battery pack of the one embodiment.

Hereinafter, non-aqueous electrolyte batteries which relate to various embodiments, a battery pack which relate to one embodiment and an automobile which relate to one embodiment will be described with reference to attached drawings. The same reference characters are attached to common components throughout the various embodiments, and a duplicate description thereof is omitted. Each figure is a schematic view to describe an embodiment and to promote an understanding thereof. A shape, dimensions or scale ratios of an embodiment shown in each figure is different from a shape, dimensions or scale ratios of an actual apparatus. The shape, dimensions or scale ratios of the actual apparatus may be appropriately changed in consideration of descriptions below and publicly known technology.

First Embodiment

FIGS. 1 to 4 show a non-aqueous electrolyte battery 60A of a first embodiment. FIG. 1 is a schematic vertical cross-sectional view of the entire non-aqueous electrolyte battery 60A of the first embodiment. FIG. 2 is a schematic vertical cross-sectional view of the entire non-aqueous electrolyte battery 60A of the first embodiment in a direction perpendicular to FIG. 1. FIG. 3 is a schematic horizontal cross-sectional view of the entire non-aqueous electrolyte battery 60A of the first embodiment.

As shown in FIG. 1, the non-aqueous electrolyte battery 60A of the first embodiment includes a container member (case) 10, and a rectangular box-shaped electrode group 21A and non-aqueous electrolyte housed in the container member (case) 10. The electrode group 21A includes at least one positive electrode 17, at least one negative electrode 18 and at least one bipolar electrode 16. And, the positive electrode 17, the negative electrode 18 and the bipolar electrode 16 are stacked in a state that separators 14 are interposed between the positive electrode 17, the negative electrode 18 and the bipolar electrode 16. An insulating member 62 such as a nonwoven fabric or a resin material is arranged on an inner peripheral surface of the container member 10.

In this embodiment, the electrode group 21A includes one bipolar electrode 16, two double-sided positive electrodes (a first positive electrode 17a and a second positive electrode 17b), two double-sided negative electrodes (a first negative electrode 18a and a second negative electrode 18b), one single-sided positive electrode 17c and a single-sided negative electrode 18c.

In each of the two double-sided positive electrodes 17 (the first positive electrode 17a and the second positive electrode 17b), positive electrode active material layers 12 are formed on both side surfaces of a rectangular current collector 11. Similarly, in each of the two double-sided negative electrodes 18 (the first negative electrode 18a and the second negative electrode 18b), negative electrode active material layers 13 are formed on both side surfaces of a rectangular current collector 11. In the bipolar electrode 16, a positive electrode active material layer 12 is formed on one side surface of a rectangular current collector 11 and a negative electrode active material layer 13 is formed on the other side surface of the rectangular current collector 11.

In the single-sided positive electrode 17c, a positive electrode active material layer 12 is formed on only one side surface of a rectangular current collector 11. Similarly, in the single-sided negative electrode 18c, a negative electrode active material layer 13 is formed on only one side surface of a rectangular current collector 11.

In the non-aqueous electrolyte battery 60A of this embodiment, the bipolar electrode 16 is arranged in an inner space of the container member 10 at a vertically central position in FIG. 1. In the bipolar electrode 16, the positive electrode active material layer 12 is disposed on an upper side surface of the current collector 11 and the negative electrode active material layer 13 is disposed on a lower side surface of the current collector 11, as shown in FIG. 1.

The first negative electrode 18a is stacked on an upper side surface of the positive electrode active material layer 12 of the bipolar electrode 16 with the separator 14 being interposed between them. Further, the first positive electrode 17a is stacked on an upper side surface of the first negative electrode 18a with the separator 14 being interposed between them. Furthermore, the single-sided negative electrode 18c is stacked on an upper side surface of the first positive electrode 17a with the separator 14 being interposed between them.

The second positive electrode 17b is stacked on a lower side surface of the negative electrode active material layer 13 of the bipolar electrode 16 with the separator 14 being interposed between them. Further, the second negative electrode 18b is stacked on a lower side surface of the second positive electrode 17b with the separator 14 being interposed between them. Furthermore, the single-sided positive electrode 17c is stacked on a lower side surface of the second negative electrode 18b with the separator 14 being interposed between them.

Figure 4B:
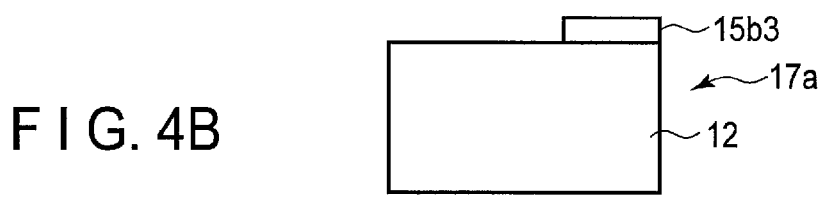
FIG. 4B is a plan view schematically showing a first positive electrode included in the electrodes constituting the electrode group of the non-aqueous electrolyte battery of the first embodiment.
Figure 4C:
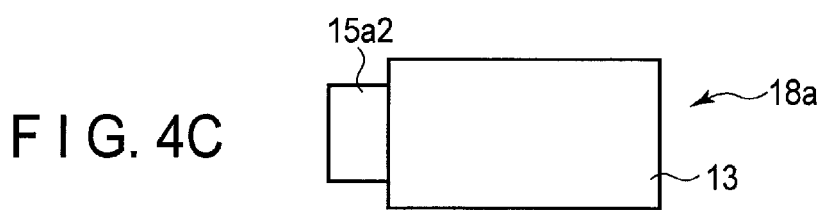
FIG. 4C is a plan view schematically showing a first negative electrode included in the electrodes constituting the electrode group of the non-aqueous electrolyte battery of the first embodiment.
Figure 4D:
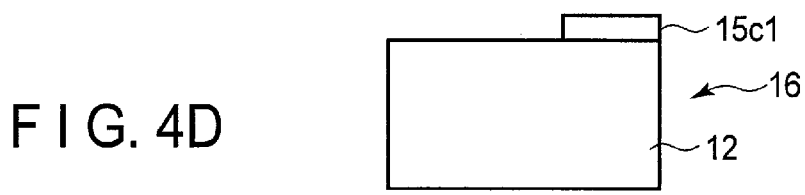
FIG. 4D is a plan view schematically showing a bipolar electrode included in the electrodes constituting the electrode group of the non-aqueous electrolyte battery of the first embodiment.
Figure 4E:
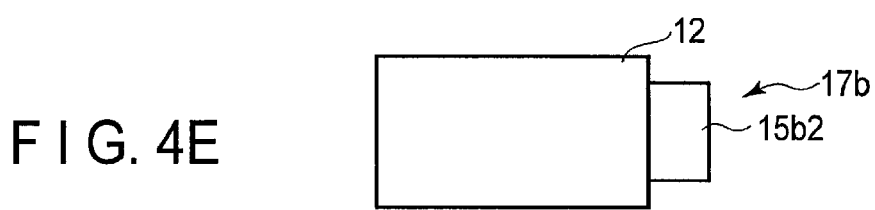
FIG. 4E is a plan view schematically showing a second positive electrode included in the electrodes constituting the electrode group of the non-aqueous electrolyte battery of the first embodiment.
Figure 4F:
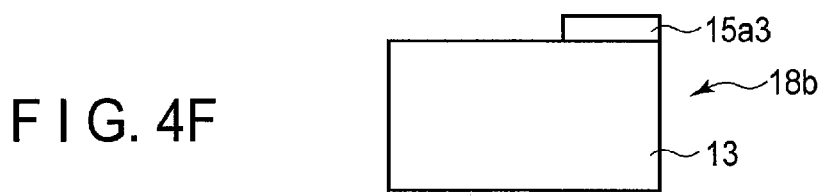
FIG. 4F is a plan view schematically showing a second negative electrode included in the electrodes constituting the electrode group of the non-aqueous electrolyte battery of the first embodiment.
Figure 4G:
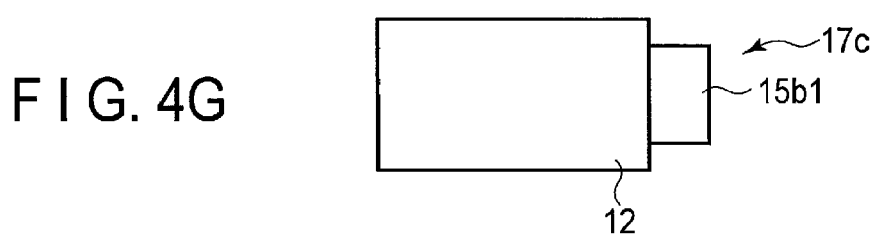
FIG. 4G is a plan view schematically showing a sided positive electrode included in the electrodes constituting the electrode group of the non-aqueous electrolyte battery of the first embodiment.

FIGS. 4A to 4G are plan views showing structures of the respective layers (electrodes) constituting the rectangular box-shaped electrode group 21A of the non-aqueous electrolyte battery 60A of the first embodiment. FIG. 4A shows the plan view of the single-sided negative electrode 18c. FIG. 4B shows the plan view of the first positive electrode 17a. FIG. 4C shows the plan view of the first negative electrode 18a. FIG. 4D shows the plan view of the bipolar electrode 16. FIG. 4E shows the plan view of the second positive electrode 17b. FIG. 4F shows the plan view of the second negative electrode 18b. And, FIG. 4G shows the plan view of the single-sided positive electrode 17c.

In the single-sided negative electrode 18c of this embodiment, a first current collecting tab 15a1 of a negative electrode side is formed by an extending portion (a leftward extending portion in FIG. 1) extended from one end side (a left end side in FIG. 1) of the current collector 11 in its longitudinal direction, as shown in FIG. 4A. In the first negative electrode 18a of this embodiment, a second current collecting tab 15a2 of a negative electrode side is formed by an extending portion (a leftward extending portion in FIG. 1) extended from one end side (a left end side in FIG. 1) of the current collector 11 in its longitudinal direction, as shown in FIG. 4C. In the second negative electrode 18b of this embodiment, a third current collecting tab 15a3 of a negative electrode side is formed by an extending portion (a rightward extending portion in FIG. 2) extended from one lateral side (a rightward lateral side in FIG. 2) of the current collector 11 in its lateral direction, as shown in FIG. 4F.

In the single-sided positive electrode 17c of this embodiment, a first current collecting tab 15b1 of a positive electrode side is formed by an extending portion (a rightward extending portion in FIG. 1) extended from another end side (a right end side in FIG. 1) of the current collector 11 in its longitudinal direction, as shown in FIG. 4G. In the second positive electrode 17b of this embodiment, a second current collecting tab 15a2 of a positive electrode side is formed by an extending portion (a rightward extending portion in FIG. 1) extended from another end side (a right end side in FIG. 1) of the current collector 11 in its longitudinal direction, as shown in FIG. 4E. In the first positive electrode 17a of this embodiment, a third current collecting tab 15b3 of a positive electrode side is formed by an extending portion (a rightward extending portion in FIG. 2) extended from one lateral side (a rightward lateral side in FIG. 2) of the current collector 11 in its lateral direction, as shown in FIG. 4B.

In the bipolar electrode 16 of this embodiment, a current collecting tab 15c1 of a bipolar electrode side is formed by an extending portion (a rightward extending portion in FIG. 2) extended from one lateral side (a rightward lateral side in FIG. 2) of the current collector 11 in its lateral direction, as shown in FIG. 4D.

In this embodiment, as shown in FIG. 1, the first current collecting tab 15a1 of the negative electrode side and the second current collecting tab 15a2 of the negative electrode side are connected with each other in the inner space of the container member 10, thus forming a first current collecting tab connecting portion 15a. The first current collecting tab connecting portion 15a extends as a negative electrode-side current collecting tab (electrode lead) 15A into an outside of the container member 10 through a through hole of the container member 10 and is connected to a negative electrode terminal 63 (see, FIG. 11).

Further, as shown in FIG. 1, the first current collecting tab 15b1 of the positive electrode side and the second current collecting tab 15b2 of the positive electrode side are connected with in the inner space of the container member 10, thus forming a second current collecting tab connecting portion 15b. The second current collecting tab connecting portion 15b extends as a positive electrode-side current collecting tab (electrode lead) 15B into the outside of the container member 10 through a through hole of the container member 10 and is connected to a positive electrode terminal 64 (see, FIG. 11).

Openings of the through holes of the container member 10 are heat sealed such that the negative electrode-side current collecting tab 15A and the positive electrode-side current collecting tab 15B are held therein, whereby the electrode group 21A and non-aqueous electrolyte of the non-aqueous electrolyte battery 60A are completely sealed in the inner space of the container member 10.

As shown in FIG. 2, the current collecting tab 15c1 of the bipolar electrode side, the third current collecting tab 15b3 of the positive electrode side and the third current collecting tab 15a3 on the negative electrode side are connected with each other in the inner space of the container member 10, thus forming a third current collecting tab connecting portion 15c. The third current collecting tab connecting portion 15c is arranged only in the inner space of the container member 10 and provides an internal connection tab.

As shown in FIG. 3, the first current collecting tab connecting portion 15a, the second current collecting tab connecting portion 15b and the third current collecting tab connecting portion 15c are arranged at different positions on an outer periphery of the electrode group 21A of the non-aqueous electrolyte battery 60A in a state that these connecting portions 15a, 15b and 15c are shifted from each other in a direction along the outer periphery of the electrode group 21A of the non-aqueous electrolyte battery 60A. Owing to such a structure as described above, the electrode group 21A of the non-aqueous electrolyte battery 60A of this embodiment has two series-connections even though it uses only one bipolar electrode 16.

Next, the non-aqueous electrolyte battery 60A of the first embodiment will be described in more detail. The electrode group 21A can hold the non-aqueous electrolyte. The non-aqueous electrolyte may be housed in the inner space of the container member 10 along with the electrode group 21A.

The non-aqueous electrolyte battery 60A of the first embodiment can prevent a leakage of the non-aqueous electrolyte through an opening provided in a lead holding portion, that is, a leakage of the non-aqueous electrolyte from an inside of the battery to an outside of the battery. In particular, as the non-aqueous electrolyte battery 60A of the first embodiment, if an electrode lead is heat sealed to a peripheral edge of an opening provided in a lead holding portion, the heat sealing exhibits a high sealing property. Thus, the leakage of the non-aqueous electrolyte from the inside of the battery to the outside of the battery can be prevented further well. The electrode group 21A may include a positive electrode and a negative electrode. Further, the electrode group 21A may include the separator 14 interposed between the positive electrode and the negative electrode.

The positive electrode may be provided with a positive electrode current collector and a positive electrode material layer formed on the positive electrode current collector.

The positive electrode material layer may be formed on the both side surfaces of the positive electrode current collector or only on one side surface thereof. Further, the positive electrode current collector may include a positive electrode material layer-free holding portion in which the positive electrode material layer is formed on neither side surface of the holding portion.

The positive electrode material layer may contain a positive electrode active material. The positive electrode material layer may further contain a conductive agent and a binding agent. The conductive agent can be compounded to enhance a current collecting performance and, at the same time, to hold a contact resistance between the positive electrode active material and the positive electrode current collector in a small value. The binding agent can be compounded to fill gaps between dispersed positive electrode active materials and to bind the positive electrode active material and the positive electrode current collector.

The positive electrode can be connected to an electrode lead (that is, a positive electrode lead) through, for example, the positive electrode material layer-free holding portion of the positive electrode current collector. The positive electrode and the positive electrode lead can be connected by, for example, welding.

The negative electrode may be provided with a negative electrode current collector and a negative electrode material layer formed on the negative electrode current collector.

The negative electrode material layer may be formed on both side surfaces of the negative electrode current collector or only on one side surface thereof. Further, the negative electrode current collector may include a negative electrode material layer-free holding portion in which the negative electrode material layer is formed on neither side surface of the holding portion.

The negative electrode material layer may contain a negative electrode active material. The negative electrode material layer may further contain a conductive agent and a binding agent. The conductive agent can be compounded to enhance a current collecting performance and, at the same time, to hold a contact resistance between the negative electrode active material and the negative electrode current collector in a small value potential. The binding agent can be compounded to fill gaps between dispersed negative electrode active materials and to bind the negative electrode active material and the negative electrode current collector.

The negative electrode can be connected to an electrode lead (that is, a negative electrode lead) through, for example, the negative electrode material layer-free holding portion of the negative electrode current collector. The negative electrode and the negative electrode lead can be connected by, for example, welding.

Hereinafter, members and materials that can be used in the non-aqueous electrolyte battery 60A of the first embodiment will be described.

[1] Negative Electrode

The negative electrode can be produced by coating a negative electrode agent paste, obtained by dispersing a negative electrode active material, a conductive agent and a binding agent in a suitable solvent, onto one side surface or both side surfaces of the negative electrode current collector 11 and by drying the paste. After drying, the negative electrode agent paste may be pressed.

As the negative electrode active materials, carbonaceous materials, metal oxides, metal sulfides, metal nitrides, alloys and light metals, each of which is capable of occluding and emitting lithium ions, may be cited.

As the carbonaceous materials which are capable of occluding and emitting lithium ions, for example, cokes, carbon fibers, heat-decomposed vapor phase carbon materials, graphite, resin sintered materials and sintered bodies of mesophase pitch type carbon fiber or mesophase spherical carbon may be cited. It is preferable to use mesophase pitch type carbon fibers or mesophase spherical carbons which are graphitized at 2500° C. or more, among these materials, because a high electrode capacity can be obtained.

As the metal oxides, for example, titanium-containing metal composite oxides, tin type oxides such as $SnB_{0.4}P_{0.6}O_{3.1}$, $SnSiO_3$ and the like, silicon type oxides such as SiO and the like, and tungsten type oxides such as $WO_3$ and the like may be cited. It is preferable to use negative electrode active materials having a potential higher by 0.5 V or more than that of metal lithium, for example, titanium-containing metal composite oxides such as lithium titanate, among these metal oxides, because, even in a case of charging the battery rapidly, generation of lithium dendrite on the negative electrode can be reduced and a deterioration of the battery can be reduced.

AS the titanium-containing metal composite oxides, for example, titanium-based oxides containing no lithium when each oxide is synthesized, lithium-titanium oxides, lithium-titanium composite oxides obtained by substituting a portion of structural elements of lithium-titanium oxides with at least one different element selected from a group consisting of Nb, Mo, W, P, V, Sn, Cu, Ni and Fe, and the like may be cited.

As the lithium-titanium oxides, lithium titanate having a spinel structure (for example, $Li_{4+x}Ti_5O_{12}$ (x is a value which is varied by charging or discharging in a range of $0 \leq x \leq 3$)), titanium oxide having a bronze structure (B) or an anatase structure (for example, $Li_xTiO_2$ ($0 \leq x \leq 1$) (the composition before charging is $TiO_2$)), ramsdellite type lithium titanate (for example, $Li_{2+y}Ti_3O_7$ (y is a value which is varied by charging or discharging in a range of $0 \leq y \leq 3$)), niobium titanium oxide (for example, $Li_xNbaTiO_7$ ($0 \leq x$, and more preferable ranges are $0 \leq x \leq 1$ and $1 \leq a \leq 4$))), and the like may be cited.

As the titanium-based oxides, $TiO_2$, a metal composite oxide containing Ti and at least one element selected from a group consisting of P, V, Sn, Cu, Ni, Co and Fe, and the like may be cited. As $TiO_2$, anatase type $TiO_2$ of low crystallinity which is heat treated at a temperature of 300 to 500° C. is preferable. As the metal composite oxide containing Ti and at least one element selected from the group consisting of P, V, Sn, Cu, Ni, Co and Fe, for example, $TiO_2—P_2O_5$, $TiO_2—V_2O_5$, $TiO_2—P_2O_5—SnO_2$, $TiO_2—P_2O_5$-MeO (Me is at least one element selected from a group consisting of Cu, Ni, Co and Fe). It is preferable that the metal composite oxide has a microstructure in which a crystal phase and an amorphous phase coexist or only the amorphous phase exists. The metal composite oxide having such a microstructure as described above can significantly improve a cycling performance. Especially, lithium-titanium oxide and the metal composite oxide containing Ti and at least one element selected from the group consisting of P, V, Sn, Cu, Ni, Co and Fe are preferable.

As the metal sulfides, lithium sulfide ($TiS_2$), molybdenum sulfide ($MoS_2$) iron sulfide (FeS, $FeS_2$, and $Li_xFeS_2$ (here, $0<x \leq 1$)) and the like are cited. AS the metal nitrides, lithium cobalt nitride ($Li_xCo_yN$ (here, $0<x<4$ and $0<y<0.5$)) and the like are cited.

Those negative electrode active materials may be used alone or plural kinds of them may be used. It is desirable that lithium titanate having a spinel structure is used as the negative electrode active material.

As the conductive agent, a carbon material may be used. As carbon materials, for example, acetylene black, carbon black, coke, carbon fibers, graphite and the like may be cited.

As the binding agent, for example, polytetrafluoroethylene (PTFE), polyvinylidene fluoride (PVdF), ethylene-propylene-diene copolymer (EPDM), styrene-butadiene rubber (SBR), carboxymethyl cellulose (CMC) or the like may be used.

As the negative electrode current collector, various metal foils may be used to correspond to the potential of the negative electrode. As these metal foils, an aluminum foil, an aluminum alloy foil, a stainless foil, a titanium foil, a copper foil, a nickel foil, and the like may be cited. A thickness of the foil is preferably 8 μm or more and 25 μm or less. In a case where the potential of the negative electrode is nobler than 0.3 V with respect to a lithium metal potential, and specifically, for example, in a case where lithium-titanium oxide as the negative electrode active material, it is preferable to use the aluminum foil or the aluminum alloy foil because a weight of the battery can be reduced.

An average crystal grain size of the aluminum foil or aluminum alloy foil is preferably 50 μm or less. This makes it possible to increase a strength of the negative electrode current collector outstandingly, and it is therefore possible to highly densify the negative electrode under a high press pressure, whereby a battery capacity can be increased.

Also, a dissolution and corrosive deterioration of the negative electrode current collector in over discharge cycles under a high temperature environment (40° C. or more) can be prevented, and it is therefore possible to reduce a rise in a negative electrode impedance. Moreover, an output performance, a rapid charging performance and a charging/discharging cycle performance can also be improved. A more preferable range of the average crystal grain size is 30 μm or less and a still more preferable range thereof is 5 μm or less.

The average crystal grain size can be obtained as follows. Firstly, a surface texture of the current collector surface is observed with an optical microscope to obtain the number "n" of crystal grains present in an area of 1 mm×1 mm. Then, an average crystal grain area "S" is obtained from the number "n" by using a formula $S=1 \times 10^{6/n}$ (μm²) And, the average crystal grain size "d" (μm) can be calculated from the obtained value of the average crystal grain area "S" by the following formula (A):

$$d=2(S/\pi)^{1/2} \tag{A}$$

In the aluminum foil or the aluminum alloy foil in which the average crystal grain size is in a range of 50 μm or less, a crystal grain size (diameter) is complicatedly affected by many factors such as a composition of the material, impurities, process conditions, a history of heat treatments, a heating condition in an annealing, and the like. Therefore, the crystal grain size (diameter) is adjusted by a combination of the factors noted above during a manufacturing process of the aluminum foil or the aluminum alloy foil.

A thickness of the aluminum foil or the aluminum alloy foil is preferably 20 μm or less and more preferably 15 μm or less. A purity of the aluminum foil is preferably 99% or more.

The aluminum alloy preferably contains at least one element such as magnesium, zinc, silicon and the like. On the other hand, it is preferable that a content of transition metal such as iron, copper, nickel, chromium or the like is 1% or less. For a battery pack mounted on a vehicle, it is particularly preferable to use the aluminum alloy foil.

As a composition ratio between the active material, the conductive agent and the binding agent in the negative electrode, it is preferable that the negative electrode active material is in a range between 80% by weight and 95% by weight, the conductive agent is in a range between 3% by weigh and 20% by weight, and the binding agent is in a range between 1.5% by weight and 7% by weight.

[2] Positive Electrode

The positive electrode is formed, for example, by coating a paste obtained by suspending a positive electrode active material, a conductive agent and a binding agent in a suitable solvent, on one side surface or both side surfaces of the positive electrode current collector, and by drying the paste. After drying, the positive electrode agent paste may be pressed.

As the positive electrode active material, various oxides, various sulfides and the like are cited. As the positive electrode active materials, for example: manganese dioxide ($MnO_2$), iron oxide, copper oxide and nickel oxide, each occluding lithium therein; lithium-manganese composite oxide (for example, $Li_xMn_2O_4$ or $Li_xMnO_2$ (here, $0 \leq x \leq 1.2$)); lithium-nickel composite oxide (for example, $Li_xNiO_2$ (here, $0 \leq x \leq 1.2$); lithium-cobalt composite oxide ($Li_xCoO_2$ (here, $0 \leq x \leq 1.2$)); lithium-nickel-cobalt composite oxide (for example, $LiNi_{1-y}Co_yO_2$ (here, $0 < y \leq 1$)); lithium-manganese-cobalt composite oxide (for example, $LiMn_yCo_{1-y}O_2$ (here, $0 < y \leq 1$)); spinel type lithium-manganese-nickel composite oxide ($Li_x Mn_{2-y}Ni_yO_4$ (here, $0 \leq x \leq 1.2$ and $0 < y \leq 1$)); lithium phosphorus oxide having an olivine structure (such as $Li_xFePO_4$, $Li_x Fe_{1-y}Mn_yPO_4$, $Li_xMnPO_4$, $Li_x Mn_{1-y}Fe_yPO_4$, $Li_xCoPO_4$ and the like (here, $0 \leq x \leq 1.2$ and $0 < y \leq 1$)); iron sulfate ($Fe_2(SO_4)_3$); vanadium oxide (for example, $V_2O_5$) and the like can be cited.

Further, as the positive electrode active materials, electroconductive polymer materials such as polyaniline, polypyrrole and the like, disulfide type polymer materials, sulfur (S), organic materials such as carbon fluoride and the like, and inorganic materials can be cited.

As more preferable positive electrode active materials, highly heat-stable spinel type lithium manganese ($Li_xMn_2O_4$ (here, $0 \leq x \leq 1.1$)), olivine type lithium iron phosphate ($Li_xFePO_4$ (here, $0 \leq x \leq 1$)), olivine type lithium manganese phosphate ($Li_xMnPO_4$ (here, $0 \leq x \leq 1$)), olivine type lithium ferromanganese phosphate ($Li_xMn_{1-y}Fe_yPO_4$ (here, $0 \leq x \leq 1$ and $0 < y \leq 0.5$)) and the like can be cited.

Alternatively, a mixture of two or more kinds of those positive electrode active materials may be used.

As the conductive agent, for example, acetylene black, carbon black, artificial graphite, natural graphite, electroconductive polymer or the like may be used.

As the binding agent, for example, polytetrafluoroethylene (PTFE), polyvinylidene fluoride (PVdF), modified PVdF obtained by substituting at least one of hydrogen and fluorine of PVdF with other substituents, copolymer of vinylidene fluoride-propylene hexafluoride, terpolymer of polyvinylidene fluoride-tetrafluoroethylene-propylene hexafluoride or the like may be used.

As the organic solvent for dispersing the binding agents, N-methyl-2-pyrrolidone (NMP), dimethylformamide (DMF) or the like may be used.

As the positive electrode current collector, an aluminum foil, an aluminum alloy foil, a stainless foil, a titanium foil or the like, each having a thickness of 8 to 25 μm, can be cited.

For the positive electrode current collector, the aluminum foil or the aluminum alloy foil is preferable. And, as in the negative electrode current collector, the average crystal grain size of the aluminum foil or the aluminum alloy foil is preferably 50 or less. The average crystal grain size of the aluminum foil or the aluminum alloy foil is more preferably 30 μm or less and still more preferably 5 μm or less. If the average crystal grain size is 50 μm or less, a strength of the aluminum foil or aluminum alloy foil can be outstandingly increased. And, it is therefore possible to highly densify the positive electrode under a high press pressure, whereby a battery capacity can be increased.

In the aluminum foil or the aluminum alloy foil in which the average crystal grain size is in a range of 50 μm or less, a crystal grain size (diameter) is complicatedly affected by many factors such as a composition of the material, impurities, process conditions, a history of heat treatments, a heating condition in an annealing, and the like. Therefore, the crystal grain size (diameter) is adjusted by a combination of the factors noted above during a manufacturing process of the aluminum foil or the aluminum alloy foil.

A thickness of the aluminum foil or the aluminum alloy foil is preferably 20 μm or less and more preferably 15 μm or less. A purity of the aluminum foil is preferably 99% or more.

The aluminum alloy preferably contains at least one element such as magnesium, zinc, silicon and the like. On the other hand, it is preferable that a content of transition metal such as iron, copper, nickel, chromium or the like is 1% or less.

As a composition ratio between the active material, the conductive agent and the binding agent in the positive electrode, it is preferable that the positive electrode active material is in a range between 80% by weight and 95% by weight, the conductive agent is in a range between 3% by weigh and 20% by weight, and the binding agent is in a range between 1.5% by weight and 7% by weight.

[3] Separator

As the separator, for example, a porous separator may be used. As the porous separator, for example, a porous film containing polyethylene, polypropylene, cellulose or polyvinylidene fluoride (PVdF), an unwoven fabric formed of synthetic resin or the like. Especially, a porous film formed of polyethylene or polypropylene or both is preferable, because it is easily provided with a shutdown function by which pores are closed to significantly reduce charge and discharge current when the a temperature of the battery is raised. And it is therefore possible to improve a safety of a secondary battery. A cellulosic separator is preferably used from a point of view of a cost reduction.

[4] Non-Aqueous Electrolyte

As the non-aqueous electrolyte, an organic electrolytic solution obtained by dissolving one or more of lithium salts selected from LiBF$_4$, LiPF$_6$, LiAsF$_6$, LiClO$_4$, LiCF$_3$SO$_3$, LiN(CF$_3$SO$_2$)$_2$, LiN(C$_2$F$_5$SO$_2$)$_2$, Li(CF$_3$SO$_2$)$_3$C, LiB[(OCO)$_2$]$_2$ and the like at a concentration range between 0.5 mol/L and 2 mol/L in an organic solvent, can be cited.

As the organic solvent: a cyclic carbonate such as a propylene carbonate (PC), an ethylene carbonate (EC) or the like; a chain carbonates such as a diethyl carbonate (DEC), a dimethyl carbonate (DMC), a methylethyl carbonate (MEC) or the like; a chain ether such as a dimethoxyethane (DME), a diethoxyethane (DEE) or the like; a cyclic ethers such as a tetrahydrofuran (THF), dioxolan (DOX) or the like; a γ-butyrolactone (GBL); an acetonitrile (AN); a sulfolane (SL) or the like may be used either singly or as a mixed solvent.

Further, a room temperature molten salt (ionic melt) containing lithium ions may be used as the non-aqueous electrolyte. If an ionic melt which comprises a lithium ion, an organic material cation and an anion and is a liquid at 100° C. or less and preferably at a room temperature or less, is selected, a secondary battery which is operable in a wide temperature range can be obtained.

[5] Case

A thickness of a stainless steel member to be used as a case (container member 10) is preferably 0.2 mm or less. For example, the case may be structured by a composite film material in which a thermally fusible resin film (thermoplastic resin film) as the innermost layer, a metal foil of the stainless steel and an organic resin film having stiffness are stacked in this order.

As the thermally fusible resin film, for example, a polyethylene (PE) film, a polypropylene (PP) film, a polypropylene-polyethylene copolymer film, an ionomer film, an ethylenevinyl acetate (EVA) film or the like may be used. Further, as the organic resin film having stiffness, for example, a polyethylene terephthalate (PET) film, a nylon film or the like may be used.

The case may be constructed by a case body having an outer envelope portion in which a recessed portion is provided as a main portion for storing the electrode group, and a lid for closing the recessed portion of the outer envelope portion of the case body. In this case, the case body and the lid may be continued in a seamless to be formed into an integrated member.

[6] Electrode Lead

As an electrode lead which can be electrically connected to the positive electrode, that is, a positive electrode lead, for example, aluminum, titanium, alloys originated from these metals or stainless steel may be used.

As an electrode lead which can be electrically connected to the negative electrode, that is, a negative electrode lead, for example, nickel, copper or alloys originated from these metals may be used. When a potential of the negative electrode is nobler than 1 V with respect to a potential of lithium metal, and, for example, in a case in which lithium titanate is used as the negative electrode active material, aluminum or an aluminum alloy may be used as a material of the negative electrode lead. In this case, it is preferable that aluminum or an aluminum alloy is used for both the positive electrode lead and the negative electrode lead because the battery can be made lightweight and its electrical resistance can be held in a small value.

From a view point of mechanical characteristics, it is preferable that each of the positive electrode lead and the negative electrode lead does not have a high strength much more than a strength of each of the positive electrode current collector and the negative electrode current collector to be connected thereto to relief a stress concentration at a connection portion. When an ultrasonic welding as one of preferable methods for connecting with the current collectors is applied, it is desirable that the Young's modulus of each of the positive electrode lead and the negative electrode lead is lower to be able to perform easily a strong welding.

For example, pure aluminum (JIS 1000 series) subjected to an annealing treatment is preferable as a material of each of the positive electrode lead and the negative electrode lead.

A thickness of the positive electrode lead is preferably 0.1 to 1 mm and more preferably 0.2 to 0.5 mm.

A thickness of the negative electrode lead is preferably 0.1 to 1 mm and more preferably 0.2 to 0.5 mm.

Next, operations and effects of the non-aqueous electrolyte battery 60A of the first embodiment having the above described structure will be described.

In the non-aqueous electrolyte battery 60A of this embodiment, as shown in FIG. 1, the first current collecting tab 15a1 on the negative electrode side and the second current collecting tab 15a2 on the negative electrode side are connected with each other in the container member 10, thus forming the first current collecting tab connecting portion 15a. Further, as shown in FIG. 1, the first current collecting tab 15b1 on the positive electrode side and the second current collecting tab 15b2 on the positive electrode side are connected with each other in the container member 10, thus forming a second current collecting tab connecting portion 15b. As shown in FIG. 2, the current collecting tab 15c1 on the bipolar electrode side, the third current collecting tab 15b3 on the positive electrode side and the third current collecting tab 15a3 on the negative electrode side are connected with each other in the container member 10, thus forming the third current collecting tab connecting portion 15c. Herein, as shown in FIG. 3, the first current collecting tab connecting portion 15a is disposed on one longitudinal end side (the left end side in FIG. 3) of the electrode group 21A. The second current collecting tab connecting portion 15b is disposed on the other longitudinal end side (the right end side in FIG. 3) of the electrode group 21A. The third current collecting tab connecting portion 15c is disposed on one lateral side (the lower side in FIG. 3) of the electrode group 21A. Thus, the first current collecting tab connecting portion 15a, the second current collecting tab connecting portion 15b and the third current collecting tab connecting portion 15c are arranged at different positions on an outer periphery of the electrode group 21A of the non-aqueous electrolyte battery 60A so that these connecting portions are shifted from each other in a direction along the outer periphery of the electrode group 21A, as shown in FIG. 3. As a result of this, after the seven electrodes (the bipolar electrode 16, the first to third negative electrodes 18a to 18c and the first to third positive electrodes 17a to 17c) constituting the electrode group 21A are stacked, it is possible to perform connecting operations such as welding for the first current collecting tab connecting portion 15a, the second current collecting tab connecting portion 15b and the third current collecting tab connecting portion 15c. Therefore, a manufacturing process of the electrode group 21A of the non-aqueous electrolyte battery 60A can be simplified. Further, it is possible to reliably prevent an electrical short-circuit between the first current collecting tab connecting portion 15a, the second current collecting tab connecting portion 15b and the third current collecting tab connecting portion 15c.

Thus, in the non-aqueous electrolyte battery 60A of this embodiment having the above described structure, the seven electrodes (the bipolar electrode 16, the first to third negative electrodes 18a to 18c and the first to third positive electrodes 17a to 17c) are stacked, and the electrode group 21A of the non-aqueous electrolyte battery 60A having two series-connections even though it uses only one bipolar electrode 16 is provided. As a result of this, it is possible to realize a higher energy density and lower resistance of the bipolar battery.

Further, since the first current collecting tab connecting portion 15a, the second current collecting tab connecting portion 15b and the third current collecting tab connecting portion 15c of the electrode group 21A are arranged at different positions on the outer periphery of the electrode group 21A of the non-aqueous electrolyte battery 60A to be shifted from each other in the direction along the outer periphery of the electrode group 21A as shown in FIG. 3, the short-circuit between these electrodes can be prevented and the welding operations for the tabs can be simplified.

Second Embodiment

Figure 6:
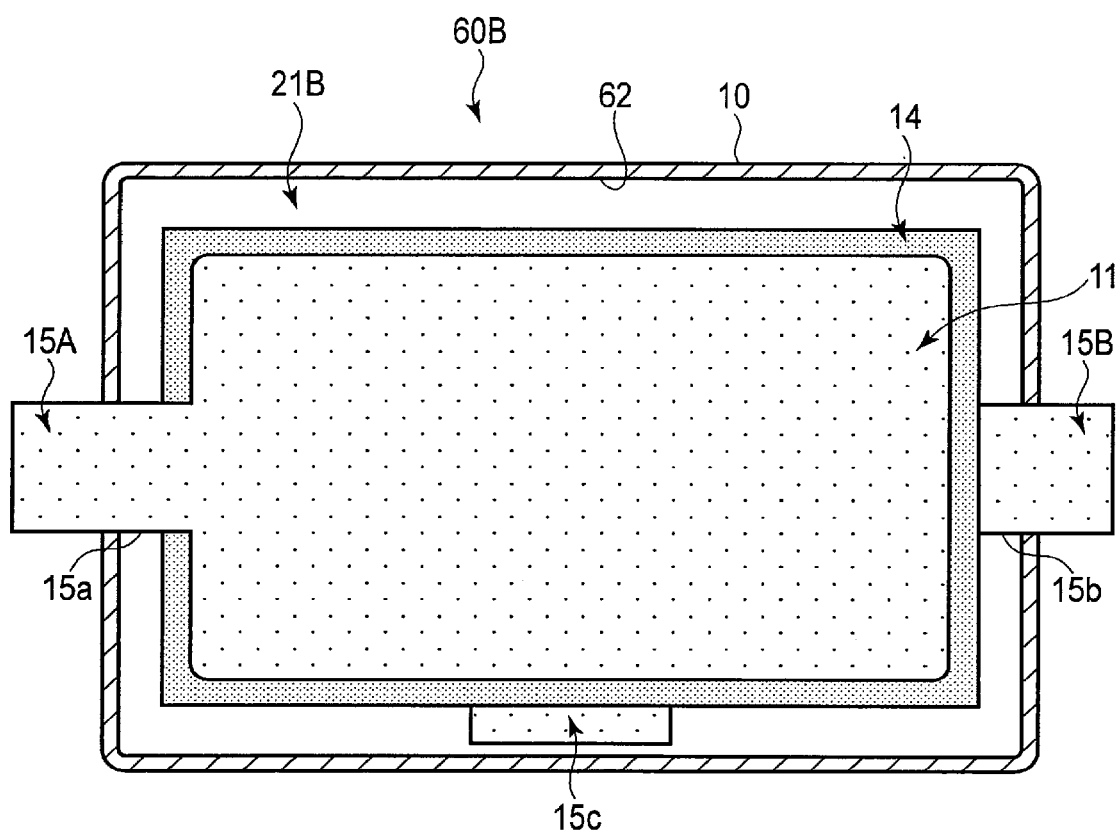
FIG. 6 is a schematic horizontal cross-sectional view of the entire non-aqueous electrolyte battery of the second embodiment.

FIGS. 5 and 6 show a second embodiment. FIG. 5 is a schematic vertical cross-sectional view of a non-aqueous electrolyte battery 60B of the second embodiment. FIG. 6 is a schematic horizontal cross-sectional view of the non-aqueous electrolyte battery 60B of the second embodiment. In FIGS. 5 and 6, the same components as those in FIGS. 1 to 4 are denoted by the same reference characters, and description of such components is omitted here.

In the non-aqueous electrolyte battery 60B of this embodiment, there is provided an electrode group 21B in which the number of stacked double-sided positive electrodes 17 and double-sided negative electrodes 18 is increased, as compared to the non-aqueous electrolyte battery 60A of the first embodiment. The electrode group 21B of this embodiment includes a bipolar electrode 16, six double-sided positive electrodes (a first positive electrode 17a1, a second positive electrode 17a2, a third positive electrode 17a3, a fourth positive electrode 17a4, a fifth positive electrode 17a5 and a sixth positive electrode 17a6), six double-sided negative electrodes (a first negative electrode 18a1, a second negative electrode 18a2, a third negative electrode 18a3, a fourth negative electrode 18a4, a fifth negative electrode 18a5 and a sixth negative electrode 18a6), a single-sided positive electrode 17c and a single-sided negative electrode 18c.

Here, the first negative electrode 18a1, the first positive electrode 17a1, the second negative electrode 18a2, the second positive electrode 17a2, the third negative electrode 18a3 and the third positive electrode 17a3 are stacked in sequence on an upper surface of the positive electrode active material layer 12 of the bipolar electrode 16 with the separators 14 being interposed between them. And, the single-sided negative electrode 18c is disposed as the uppermost layer of the electrode group 21B. Further, the fourth positive electrode 17a4, the fourth negative electrode 18a4, the fifth positive electrode 17a5, the fifth negative electrode 18a5, the sixth positive electrode 17a6 and the sixth negative electrode 18a6 are stacked in sequence on a lower surface of the negative electrode active material layer 13 of the bipolar electrode 16 with the separators 14 being interposed between them. And, the single-sided positive electrode 17c is disposed as the lowermost layer of the electrode group 21B.

In the single-sided negative electrode 18c, a first current collecting tab 15a1 on the negative electrode side is formed by an extending portion (a leftward extending portion in FIG. 5) extended from one end side (a left end side in FIG. 5) of the current collector 11 in its longitudinal direction, as shown in FIG. 5. In the first negative electrode 18a, a second current collecting tab 15a2 on the negative electrode side is formed by an extending portion (a leftward extending portion in FIG. 5) extended from one end side (a left end side in FIG. 5) of the current collector 11 in its longitudinal direction, as shown in FIG. 5. Similarly, in each of the second negative electrode 18a2 and the third negative electrode 18a3, a third current collecting tab 15a3 or a fourth current collecting tab 15a4 is formed by an extending portion (a leftward extending portion in FIG. 5) extended from one end side (a left end side in FIG. 5) of the current collector 11 in its longitudinal direction, as shown in FIG. 5. As shown in FIG. 5, the first current collecting tab 15a1 on the negative electrode side, the second current collecting tab 15a2 on the negative electrode side, the third current collecting tab 15a3 on the negative electrode side and the fourth current collecting tab 15a4 on the negative electrode side are connected with each other in the container member 10, thus forming a first current collecting tab connecting portion 15a. The first current collecting tab connecting portion 15a extends as a negative electrode-side current collecting tab (electrode lead) 15A to an outside of the container member 10 through a through hole of the container member 10 and is connected to a negative electrode terminal 63 (see, FIG. 11).

In the single-sided positive electrode 17c, a first current collecting tab 15b1 on the positive electrode side is formed by an extending portion (a rightward extending portion in FIG. 5) extended from another end side (a right end side in FIG. 5) of the current collector 11 in its longitudinal direction, as shown in FIG. 5. In the fourth positive electrode 17a4, a second current collecting tab 15b2 on the positive electrode side is formed by an extending portion (a rightward extending portion in FIG. 5) extended from another end side (a right end side in FIG. 5) of the current collector 11 in its longitudinal direction, as shown in FIG. 5. Similarly, in each of the fifth positive electrode 17a5 and the sixth positive electrode 17a6, a third current collecting tab 15b3 or a fourth current collecting tab 15b4 is formed by an extending portion (a rightward extending portion in FIG. 5) extended from another end side (a right end side in FIG. 5) of the current collector 11 in its longitudinal direction, as shown in FIG. 5. As shown in FIG. 5, the first current collecting tab 15b1 on the positive electrode side, the second current collecting tab 15b2 on the positive electrode side, the third current collecting tab 15b3 on the positive electrode side and the fourth current collecting tab 15b4 on the positive electrode side are connected with each other in the container member 10, thus forming a second current collecting tab connecting portion 15b. The second current collecting tab connecting portion 15b extends as a positive electrode-side current collecting tab (electrode lead) 15B to the outside of the container member 10 through a through hole of the container member 10 and is connected to a positive electrode terminal 64 (see, FIG. 11).

In the bipolar electrode 16, the current collecting tab 15c1 (see FIG. 2) on the bipolar electrode side is formed by an extending portion (a laterally extending portion extending in a direction rising from a sheet of FIG. 5) extended from one lateral end side (a lateral end side in a direction rising from the sheet of FIG. 5) of the current collector 11. In each of the first positive electrode 17a1, the second positive electrode 17a2 and the third positive electrode 17a3, a third current collecting tab 15b3 (see FIG. 2) on the positive electrode side is formed by an extending portion (a laterally extending portion extending in a direction rising from a sheet of FIG. 5) extended from one lateral end side (a lateral end side in a direction rising from the sheet of FIG. 5) of the current collector 11. In each of the fourth negative electrode 18a4, the fifth negative electrode 18a5 and the sixth negative electrode 18a6, a third current collecting tab 15a3 (see FIG. 2) on the negative electrode side is formed by an extending portion (a laterally extending portion extending in a direction rising from a sheet of FIG. 5) extended from one lateral end side (a lateral end side in a direction rising from the sheet of FIG. 5) of the current collector 11.

The current collecting tab 15c1 on the bipolar electrode side, the three third current collecting tabs 15b3 on the positive electrode side and the three third current collecting tabs 15a3 on the negative electrode side are connected with each other in the container member 10, thus forming a third current collecting tab connecting portion 15c. The third current collecting tab connecting portion 15c is arranged only in the inner space of the container member 10 and forms an internal connection tab.

In this embodiment, as shown in FIG. 6, the first current collecting tab connecting portion 15a, the second current collecting tab connecting portion 15b and the third current collecting tab connecting portion 15c are arranged at different positions on a periphery of the electrode group 21B of the non-aqueous electrolyte battery 60B to be shifted from each other in a direction along the periphery of the electrode group 21B. As a result of this, in this embodiment, the electrode group 21B of the non-aqueous electrolyte battery 60B, in which the stacking number of the both-sided positive electrodes 17 and both-sided negative electrodes 18 is increased in comparison with the first embodiment and two series-connections are obtained even though it uses only one bipolar electrode 16, is provided.

And, a capacity of the electrode group 21B of the non-aqueous electrolyte battery 60B of this embodiment is higher by 2.33 times than a capacity of the electrode group 21A of the non-aqueous electrolyte battery 60A of the first embodiment.

In the non-aqueous electrolyte battery 60B of this embodiment, the bipolar electrode 16, the six double-sided positive electrodes 17a1 to 17a6 and the six double-sided negative electrodes 18a1 to 18a6, the single-sided positive electrode 17c and the single-sided negative electrode 18c are stacked, and the electrode group 21B of the non-aqueous electrolyte battery 60B having two series-connections even though it uses only one bipolar electrode 16 is provided. As a result of this, it is possible to realize a higher energy density and lower resistance of the bipolar battery.

Further, since the first current collecting tab connecting portion 15a, the second current collecting tab connecting portion 15b and the third current collecting tab connecting portion 15c of the electrode group 21B are arranged at different positions on the outer periphery of the electrode group 21B of the non-aqueous electrolyte battery 60B to be shifted from each other in the direction along the outer periphery of the electrode group 21B as shown in FIG. 6, the short-circuit between these electrodes can be prevented and the welding operations for the tabs can be simplified.

Third Embodiment

FIGS. 7 and 8 show a third embodiment. FIG. 7 is a schematic vertical cross-sectional view of a non-aqueous electrolyte battery 60C of the third embodiment. FIG. 8 is a schematic horizontal cross-sectional view of the non-aqueous electrolyte battery 60C of the third embodiment. In FIGS. 7 and 8, the same components as those in FIGS. 1 to 4 are denoted by the same reference characters, and description of such components is omitted here.

In the non-aqueous electrolyte battery 600 of this embodiment, there is provided an electrode group 21C in which the number of stacked bipolar electrodes 16 is increased, as compared to the non-aqueous electrolyte battery 60A of the first embodiment. The electrode group 21C of this embodiment includes the four bipolar electrodes 16, the five double-sided positive electrodes 17, the five double-sided negative electrodes 18, the single-sided positive electrode 17c and the single-sided negative electrode 18c.

In the electrode group 21C of this embodiment, as shown in FIG. 7, the single-sided negative electrode 18c is disposed as the uppermost layer, and the single-sided positive electrode 17c is disposed as the lowermost layer. The four bipolar electrodes 16 are arranged so as to be spaced from each other between the single-sided positive electrode 17c and the single-sided negative electrode 18c. A combination of the double-sided positive electrode 17 and the double-sided negative electrode 18 is arranged in a space between the upper most single-sided negative electrode 18c and the upper most bipolar electrode 16. The combination is also arranged in each of spaces between the bipolar electrodes 16 arranged between the uppermost bipolar electrode 16 and the lowermost bipolar electrode 16. The combination is further arranged in a space between the lowermost single-sided positive electrode 17c and the lower most bipolar electrode 16.

The first current collecting tab connecting portion 15a is disposed at one end portion (a left end portion in FIG. 7) on an uppermost layer of the electrode group 21C, as shown in FIG. 7. The second current collecting tab connecting portion 15b is disposed at another end portion (a right end portion in FIG. 7) on a lower layer of the electrode group 21C, as shown in FIG. 7. Here, the first current collecting tab connecting portion 15a is formed by connecting the first current collecting tab 15a1 on the negative electrode side and the second current collecting tab 15a2 on the negative electrode side in the container member 10. Similarly, the second current collecting tab connecting portion 15b is formed by connecting the first current collecting tab 15b1 on the positive electrode side and the second current collecting tab 15b2 on the positive electrode side are connected in the container member 10.

The four current collecting tabs 15c1 on the bipolar electrode side, the third current collecting tabs 15b3 on the positive electrode side of the four double-sided positive electrodes 17 and the third current collecting tabs 15a3 on the negative electrode side of the four double-sided negative electrodes 18 are connected with each other in the inner space of the container member 10, thus forming four third current collecting tab connecting portions 15c1 to 15c4 shown in FIG. 8.

Here, the two third current collecting tab connecting portions 15c1 and 15c2 are arranged side-by-side on one lateral side (an upper side in FIG. 8) of the electrode group 21C to be spaced apart from each other. The remaining two third current collecting tab connecting portions 15c3 and 15c4 are arranged side-by-side on another lateral side (a lower side in FIG. 8) of the electrode group 21C to be spaced apart from each other.

As a result of this, the first current collecting tab connecting portion 15a, the second current collecting tab connecting portion 15b and the four third current collecting tab connecting portions 15c1 to 15c4 are arranged at different portions on an outer periphery of the electrode group 21C of the non-aqueous electrolyte battery 60C to be shifted from each other in a direction along the outer periphery of the electrode group 21C, as shown in FIG. 8. As a result of this, the electrode group 21C of the non-aqueous electrolyte battery 60C of this embodiment, in which five series-connections are obtained by using four bipolar electrodes 16, is provided.

And, a capacity of the electrode group 21C of the non-aqueous electrolyte battery 60C of this embodiment is the same as that of the electrode group 21A of the non-aqueous electrolyte battery 60A of the first embodiment.

In the non-aqueous electrolyte battery 60C of this embodiment, the four bipolar electrodes 16, the five double-sided positive electrodes 17, the five double-sided negative electrodes 18, the single-sided positive electrode 17c and the single-sided negative electrode 18c are stacked, and the electrode group 21C of the non-aqueous electrolyte battery 60C having five series-connections by using the four bipolar electrodes 16 is provided. As a result of this, it is possible to realize a higher energy density and lower resistance of the bipolar battery.

Further, since the first current collecting tab connecting portion 15a, the second current collecting tab connecting portion 15b and the four third current collecting tab connecting portions 15c of the electrode group 21C are arranged at different positions on the outer periphery of the electrode group 21C of the non-aqueous electrolyte battery 60O to be shifted from each other in the direction along the outer periphery of the electrode group 21C as shown in FIG. 8, the short-circuit between these electrodes can be prevented and the welding operations for the tabs can be simplified.

Fourth Embodiment

Figure 9:
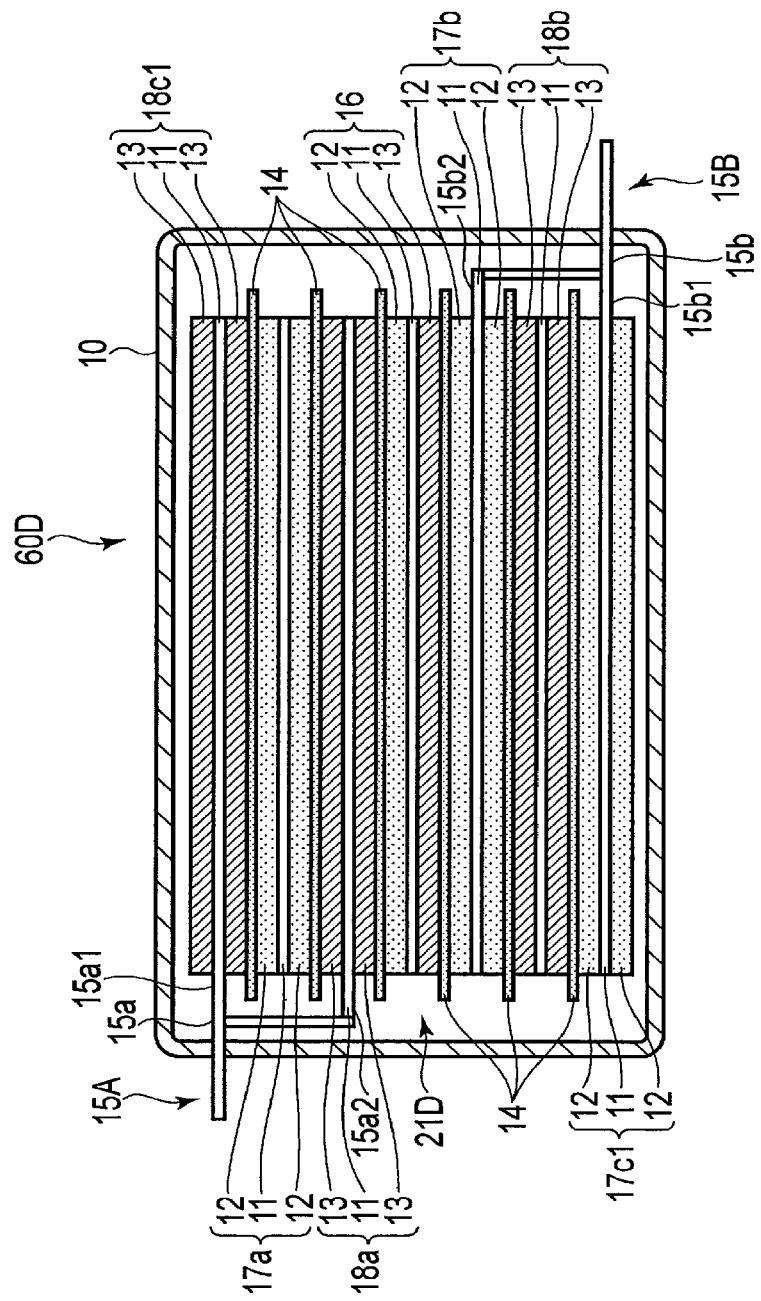
FIG. 9 is a schematic vertical cross-sectional view of the entire non-aqueous electrolyte battery of a fourth embodiment.

FIG. 9 is a schematic vertical cross-sectional view of a non-aqueous electrolyte battery 60D of a fourth embodiment. In FIG. 9, the same components as those in FIGS. 1 to 4 are denoted by the same reference characters, and description of such components is omitted here.

In the non-aqueous electrolyte battery 60D of this embodiment, a double-sided negative electrode 18c1 is provided as the uppermost layer of an electrode group 21D, instead of the single-sided negative electrode 18c as the uppermost layer of the electrode group 21A of the non-aqueous electrolyte battery 60A of the first embodiment. And, at the same time, a double-sided positive electrode 17c1 is provided as the lowermost layer of the electrode group 21D, instead of the single-sided positive electrode 17c as the lowermost layer of the electrode group 21A.

In the non-aqueous electrolyte battery 60D of this embodiment, the double-sided negative electrode 18c1 is provided as the uppermost layer of the electrode group 21D, and the double-sided positive electrode 17c1 is provided as the lowermost layer of the electrode group 21D. Therefore, a deformation such as twisting of each of the double-sided negative electrode 18c1 as the uppermost layer and the double-sided positive electrode 17c1 as the lowermost layer will be prevented, because a difference in expansion or shrinkage of materials of both side surfaces of each of the double-sided negative electrode 18c1 as the uppermost layer and the double-sided positive electrode 17c1 as the lowermost layer will not be caused by a press of the electrode or by a charging or discharging of the non-aqueous electrolyte battery 60D of this embodiment. Further, the bipolar electrode 16 in the electrode group 21D, which is sandwiched between one combination of the double-sided negative electrode 18 and double-sided positive electrode 17 and another combination thereof, can be prevented from its deformation such as twisting.

Fifth Embodiment

FIG. 10 is a schematic vertical cross-sectional view of a non-aqueous electrolyte battery 60E of a fifth embodiment. In FIG. 10, the same components as those in FIGS. 1 to 4 are denoted by the same reference characters, and description of such components is omitted here.

In the non-aqueous electrolyte battery 60E of this embodiment, a double-sided negative electrode 18c1 is provided as the uppermost layer of an electrode group 21E, instead of the single-sided negative electrode 18c as the uppermost layer of the electrode group 21A of the non-aqueous electrolyte battery 60A of the first embodiment, and, at the same time, a bipolar electrode 16 is provided as the lowermost layer of the electrode group 21E, instead of the single-sided positive electrode 17c as the lowermost layer of the electrode group 21A.

In the non-aqueous electrolyte battery 60E of this embodiment, a non-charging portion on an outer side of each of the uppermost and lowermost layers of the electrode group 21E may be as a negative electrode. Here, in the material of the positive electrode, transition metal may elute in an uncharged state, and, on the other hand, the negative electrode may be formed of a material which is stable even in the uncharged state. Thus, by making the non-charging portion on the outer side of each of the uppermost and lowermost layers of the electrode group 21E be as a negative electrode, a metal elution from the non-charging portions can be prevented, and the stable non-aqueous electrolyte battery 60E can be manufactured.

Example 1

Example 1 comprises three bipolar electrodes 16, the positive electrode 17, the negative electrode 18, and the non-aqueous electrolyte. Each bipolar electrode 16 includes the current collector 11, the positive electrode active material layer 12 formed on one side surface of the current collector 11 and the negative electrode active material layer 13 formed on the other side surface of the current collector 11. The positive electrode 17 includes the positive electrode active material layers 12 on the both side surfaces of the current collector 11. The negative electrode 18 includes the negative electrode active material layers 13 on the both side surfaces of the current collector 11. The positive electrode 17 and the negative electrode 18 are sandwiched between the two bipolar electrodes 16. The positive electrode 17, the negative electrode 18 and the two bipolar electrodes 16 are stacked such that the negative electrode 18 is adjacent to and face the positive electrode active material layer 12 of the bipolar electrode 16, and the positive electrode 17 is adjacent to and face the negative electrode active material layer 13 of the bipolar electrode 16. Aluminum is used as a raw material of the current collector 11, and the current collector 11 is formed in a square shape whose one side has a length of, for example, 8 cm. Lithium-manganese phosphate (hereinafter referred to as LMP) is used for the positive electrode active material layer 12, and lithium titanate (hereinafter referred to as LTO) is used for the negative electrode active material layer 13. The positive electrode active material layer 12 can occlude and emit lithium. In the negative electrode active material layer 13, a reaction potential resides near 1.5 V. LMP or LTO, a conductive auxiliary agent and a binder are mixed such that carbon is 5 wt. % and polyvinylidene fluoride is 10 wt. % relative to a total weight of the electrode group 21A of an electrode body. And, a test cell for an example 1 is produced by molding the mixture of them.

Example 2

A test cell for an example 2 is produced by the same forming processes as those for the example 1 except that four pairs of the positive electrode 17 and the negative electrode 18 are alternately stacked between the bipolar electrodes 16.

Example 3

A test cell for an example 3 is produced by the same forming processes as those for the example 2, using six bipolar electrodes 16.

Comparative Example 1

Seven positive electrodes 17 and seven negative electrodes 18 are stacked alternately.

Comparative Example 2

Three bipolar electrodes 16 are stacked.

Comparative Example 3

Six bipolar electrodes 16 are stacked.

Comparative Example 4

The current collector 11 is formed in a square shape whose one side has a length of 24 cm.

Next, a constant current charge-discharge test is conducted in each of the examples 1 to 3 and comparative examples 1 to 4. A discharge capacity and an average operating voltage are calculated from the test results. The obtained values are shown in Table 1. Cell resistance values under a condition of a charging depth of 50% in the example 3 and the comparative example 4 are shown in Table 2.

TABLE 1

|  | Discharge capacity (mAh) | Average operating voltage (V) |
| --- | --- | --- |
| Example 1 | 300 | 5.0 |
| Example 2 | 900 | 5.0 |
| Example 3 | 900 | 12.5 |
| Comparative example 1 | 900 | 2.5 |
| Comparative example 2 | 100 | 5.0 |
| Comparative example 3 | 100 | 12.5 |
| Comparative Example 4 | 900 | 12.5 |

TABLE 2

|  | Cell resistance (mΩ) |
| --- | --- |
| Example 3 | 120 |
| Comparative Example 4 | 160 |

As shown in Table 1, according to this embodiment, it is possible to provide a non-aqueous electrolyte secondary battery having a high capacity and a high operating voltage.

According to the Comparative Example 4, the capacity of the cell can be increased by increasing an electrode area. However, in the case of the Comparative Example 4, the cell resistance increases as shown in Table 2. Accordingly, it is obvious that the Examples 1 to 3 have more excellent characteristics than the Comparative Examples 1 to 4.

Figure 11:
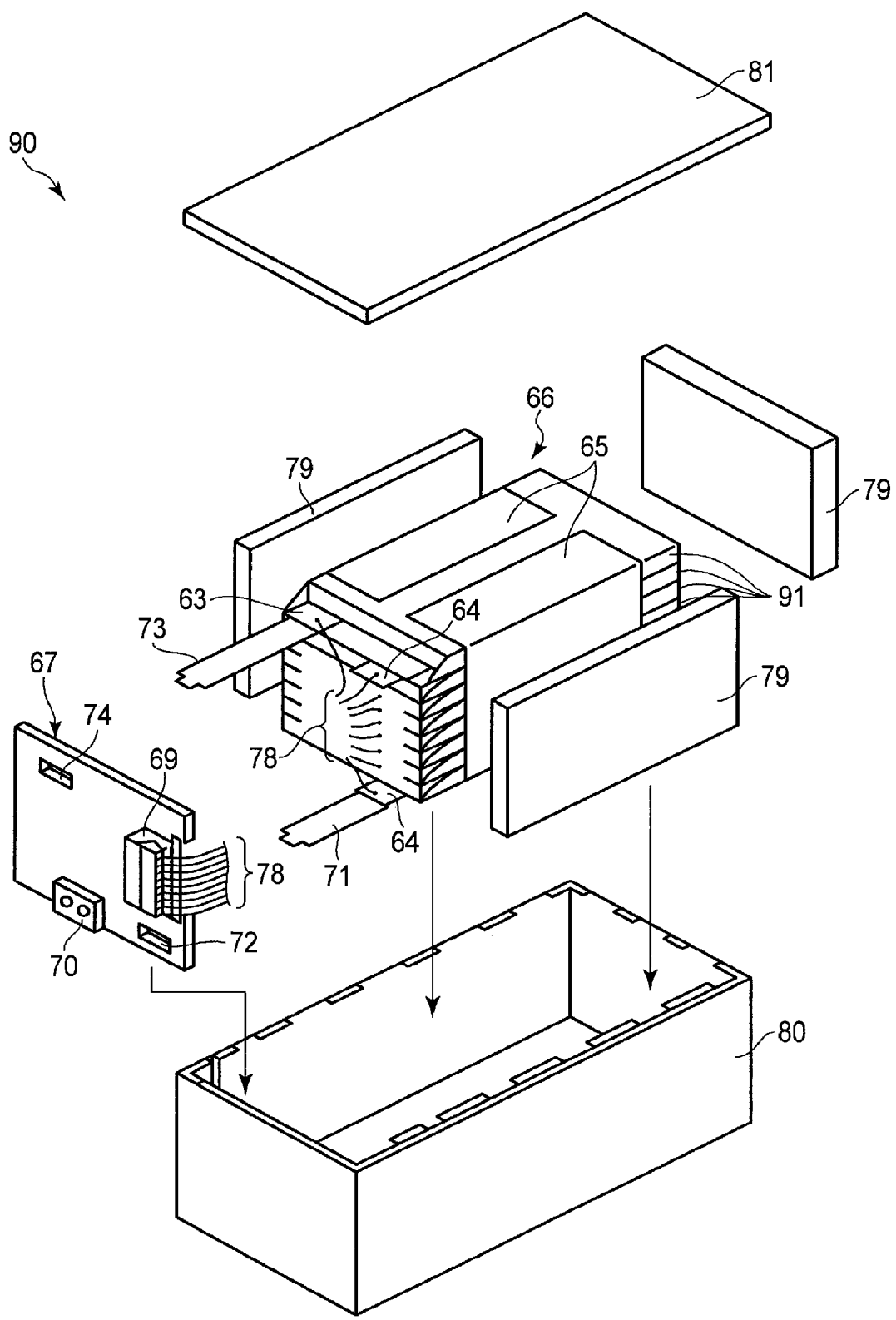
FIG. 11 is an exploded perspective view schematically showing a structure of a battery pack in which plural non-aqueous electrolyte batteries, each according to the first embodiment, are bundled.
Figure 12:
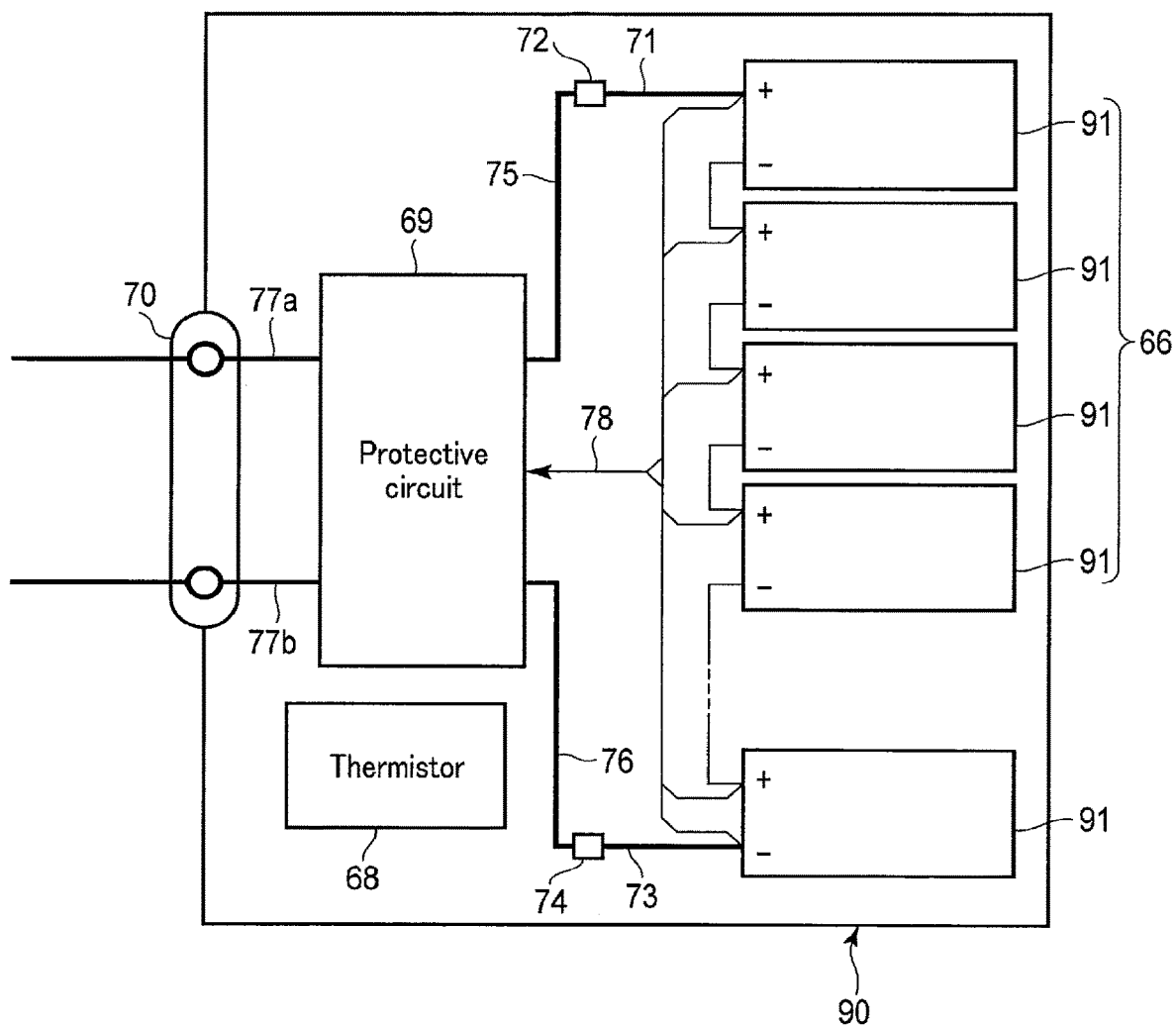
FIG. 12 is a block diagram schematically showing an electric circuit of the battery pack in FIG. 11.

FIG. 11 is an exploded perspective view schematically showing a structure of a battery pack 90 of the non-aqueous electrolyte batteries 60A each according to the first embodiment. FIG. 12 is a block diagram showing an electric circuit for the battery pack 90 in FIG. 11. The battery pack 90 shown in FIGS. 11 and 12 includes a plurality of unit cells 91. Each unit cell 91 is the non-aqueous electrolyte battery 60A described with reference to FIG. 1.

The plurality of unit cells 91 are stacked such that negative electrode terminals 63 and positive electrode terminals 64 extending outward are aligned in the same direction, and are fastened with each other by an adhesive tape 65 to constitute a battery module 66. As shown in FIG. 12, these unit cells 91 are electrically connected to each other in series.

A printed wiring board 67 is arranged to opposite to side surfaces of the unit cells 91 from which the negative electrode terminals 63 and positive electrode terminal 64 of the unit cells 91 extend. As shown in FIG. 12, a thermistor 68, a protective circuit 69 and a terminal 70 (an external terminal for electrifying) for electrifying to external devices are mounted on the printed wiring board 67. An electrical insulating plate (not shown) for avoiding unnecessary connection to wires of the battery module 66 is mounted on a surface of the printed wiring board 67 opposing to the battery module 66.

A positive electrode lead 71 is connected to the positive electrode terminal 64 positioned in one of the both outer sided unit cells 91 of the battery module 66, and the tip end thereof is inserted into a positive electrode connector 72 of the printed wiring board 67 and is electrically connected thereto.

A negative electrode lead 73 is connected to the negative electrode terminal 63 positioned in the other of the both outer sided unit cells 91 of the battery module 66, and the tip end thereof is inserted into a negative electrode connector 74 of the printed wiring board 67 and is electrically connected thereto. Those connectors 72 and 74 are connected to the protective circuit 69 through wires 75 and 76 formed on the printed wiring board 67.

The thermistor 68 detects a temperature of each unit cell 91 and a detection signal corresponding to the temperature is sent to the protective circuit 69. The protective circuit 69 is used to control a charge and discharge of the unit cell 91. The protective circuit 69 can cut off a positive-side wire 77a and negative-side wire 77b between the protective circuit 69 and the terminal 70 for electrifying to external devices under predetermined conditions. One of the predetermined conditions is, for example, when the temperature detected by the thermistor 68 is equal to or higher than a predetermined temperature. The other of the predetermined conditions is when an over-charge, an over-discharge, an over-current or the like of the unit cell 91 is detected. The detection of the over-charge and the like is carried put for each of the unit cells 91 or the whole of the battery module 66. In this embodiment, although the battery module 66 is provided as the battery pack 90, a control circuit of an external device, for example, a vehicle, may be used.

For the detection of each of the unit cells 91, a battery voltage, a positive electrode potential or a negative electrode potential may be detected. When the positive electrode potential or the negative electrode potential is detected, a lithium electrode used as a reference electrode is inserted into each of the unit cells 91. In the case of the battery pack 90 of FIG. 11 and FIG. 12, a wire 78 for voltage detection is connected to each of the unit cells 91. A detection signal is sent to the protective circuit 69 through these wires 78.

A protective sheet 79 made of rubber or resin is arranged on each of three side surfaces of the battery module 66 excluding one side surface from which the negative electrode terminal 63 and the positive electrode terminal 64 protrude.

The battery module 66 together with the protective sheets 79 and the printed wiring board 67 is housed in a container 80. That is, the protective sheet 79 is arranged on each of both inner side surfaces of the container 80 extending in a long side direction and one of both inner side surfaces of the container 80 extending in a short side direction, and the printed wiring board 67 is arranged on the other of the both inner surfaces. That is, the battery module 66 surrounded by the protective sheets 79 and the printed wiring board 67 is positioned in an inner space of the container 80. An opening of the container 80 is covered with a cover 81.

Instead of the adhesive tape 65, a heat-shrinkable tape may be used to fix the unit cells 91 of the battery module 66. In this case, the heat-shrinkable tape is wound around the battery module 66 after the protective sheets 79 are arranged on the both longitudinal side surfaces of the battery module 66, and then the heat-shrinkable tape is thermally shrunk to tie the unit cells 91 of the battery module 66 together with the protective sheets 79 together.

In FIGS. 11 and 12, the unit cells 91 are connected in series, but the unit cells 91 may be connected in parallel to increase a battery capacity of the battery module 66. A plurality of the battery packs 90 may be connected in series and/or in parallel.

Also, a form of the battery pack 90 is appropriately changed according to its uses. The battery pack 90 is preferably used for a use that requires a good cycle characteristic under a large current. As concrete uses, a power supply for a digital camera and an on-board power supply used for vehicles such as two-wheeled to four-wheeled hybrid electric vehicles, two-wheeled to four-wheeled electric vehicles and motor-assisted bicycles can be cited. The battery pack 90 is particularly suitable for on-board uses.

According to those embodiments, it is possible to provide a non-aqueous electrolyte battery and a battery pack which can realize a higher energy density and lower resistance of a bipolar battery and can prevent short-circuit between electrodes and simplify welding operation for tabs.

Figure 13:
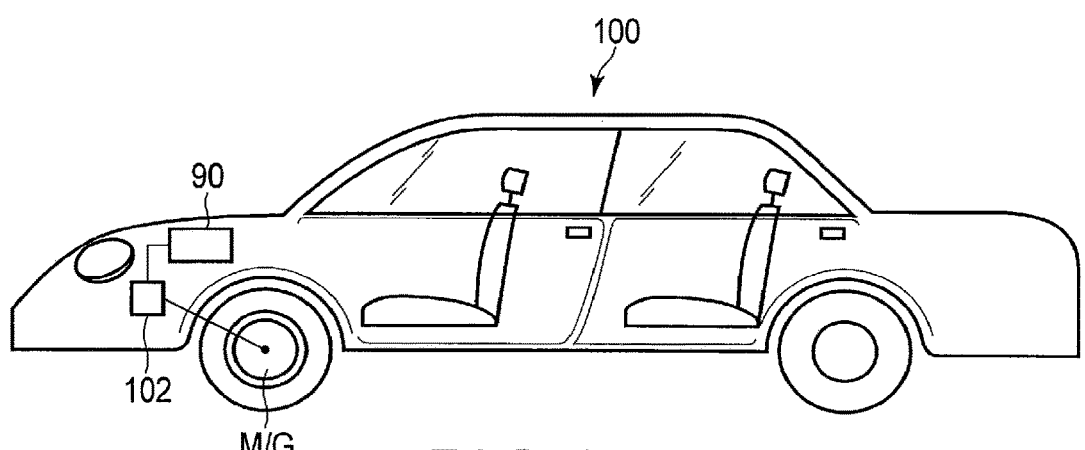
FIG. 13 is a schematic side view schematically showing an example of an automobile that is a kind of a vehicle and that comprises the battery pack of the non-aqueous electrolyte batteries according to the first embodiment and shown in FIG. 11.

FIG. 13 shows an example of an automobile 100 that is a kind of a vehicle and that comprises the battery pack 90 (see FIG. 11) of the non-aqueous electrolyte batteries 60A according to the first embodiment.

The battery pack 90 is installed in an engine room of the automobile 100. The installing position of the battery pack 90 is not limited to the engine room. For example, the battery pack 90 may also be positioned in a rear part of the automobile 100 or under seats of the automobile 100. In this example, the battery pack 90 is configured to recover a regenerative energy of a power of the vehicle. A motor/generator M/G is coupled to the wheels of the automobile 100, and the battery pack 90 is combined with a control unit 102 connected to the motor/generator M/G. The control unit 102 is configured to selectively supply an electric power of the battery pack 90 to the motor/generator M/G or recover a regenerative energy of a power of the vehicle to the battery pack 90.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A non-aqueous electrolyte battery comprising
an electrode group including one or more positive electrodes, one or more negative electrodes, one or more bipolar electrodes, and separators, the one or more positive electrodes, the one or more negative electrodes and the one or more bipolar electrodes being stacked in a stacking direction with the separators being interposed between them,
the electrode group including an outer peripheral part which faces an outer side in a direction crossing the stacking direction,
each of the one or more positive electrodes including a positive electrode current collector, and a first positive electrode active material layer formed on a surface of the positive electrode current collector,
each of the one or more negative electrodes including a negative electrode current collector, and a first negative electrode active material layer formed on a surface of the negative electrode current collector,
each of the one or more bipolar electrodes including a bipolar electrode current collector, a second positive electrode active material layer and a second negative electrode active material layer, the bipolar electrode current collector of each of the one or more bipolar electrodes including a first surface facing one side of the stacking direction, and a second surface facing a side opposite to a side where the first surface faces in the stacking direction, the second positive electrode active material layer being formed only on the first surface in the bipolar electrode current collector of each of the one or more bipolar electrodes, the second negative electrode active material layer being formed only on the second surface in the bipolar electrode current collector of each of the one or more bipolar electrodes,
the electrode group including a first connecting portion to which the positive electrode current collector of at least one of the one or more positive electrodes is connected, a second connecting portion to which the negative electrode current collector of at least one of the one or more negative electrodes is connected, and a third connecting portion to which the bipolar electrode current collector of at least one of the one or more bipolar electrodes is connected, and
the first connecting portion, the second connecting portion and the third connecting portion being arranged on the outer peripheral part of the electrode group and being shifted relative to one another in a direction along the outer peripheral part of the electrode group,
one of the separators, the negative electrode active material layer of one of the one or more negative electrodes, and the current collector of the one of the one or more negative electrodes being stacked in sequence on a surface of the positive electrode active material layer of one of the one or more bipolar electrodes,
one of the separators, the positive electrode active material layer of one of the one or more positive electrodes, and the current collector of the one of the one or more positive electrodes being stacked in sequence on a surface of the negative electrode active material layer of the one of the one or more bipolar electrodes,
the first or second negative electrode active material layer being formed on an outer surface of each of both outermost current collectors.

2. The non-aqueous electrolyte battery according to claim 1, wherein
the positive electrode current collector of each of the one or more positive electrodes includes a third surface facing one side of the stacking direction, and a fourth surface facing a side opposite to a side where the third surface faces in the stacking direction, the first positive electrode active material layer being formed on both the third surface and the fourth surface in the positive electrode current collector of each of the one or more positive electrodes, and
the negative electrode current collector of each of the one or more negative electrodes includes a fifth surface facing one side of the stacking direction, and a sixth surface facing a side opposite to a side where the fifth surface faces in the stacking direction, the first negative electrode active material layer being formed on both the fifth surface and the sixth surface in the negative electrode current collector of each of the one or more negative electrodes.

3. The non-aqueous electrolyte battery according to claim 1, wherein
the one or more bipolar electrodes include a plurality of bipolar electrodes, and
at least one of the one or more positive electrodes and at least one of the one or more negative electrodes are disposed between the plurality of bipolar electrodes.

4. The non-aqueous electrolyte battery according to claim 1, wherein
the one or more bipolar electrodes include a plurality of bipolar electrodes,
one of the one or more negative electrodes is stacked on the second positive electrode active material layer of each of the plurality of bipolar electrodes, and
one of the one or more positive electrodes is stacked on the second negative electrode active material layer of each of the plurality of bipolar electrodes.

5. The non-aqueous electrolyte battery according to claim 1, wherein
the one or more bipolar electrodes include a plurality of bipolar electrodes,
at least one of the one or more positive electrodes and at least one of the one or more negative electrodes are disposed between the plurality of bipolar electrodes,
one of the one or more negative electrodes is stacked on the second positive electrode active material layer of each of the plurality of bipolar electrodes, and
one of the one or more positive electrodes is stacked on the second negative electrode active material layer of each of the plurality of bipolar electrodes.

6. The non-aqueous electrolyte battery according to claim 1, wherein each of the first and second negative electrode active material layers has a reaction potential of near 1.5 V.

7. The non-aqueous electrolyte battery according to claim 1, wherein a negative electrode active material of each of the first and second negative electrode active material layers includes titanium-containing oxide.

8. A non-aqueous electrolyte battery pack comprising the non-aqueous electrolyte battery according to claim 1.

9. The non-aqueous electrolyte battery pack according to claim 8, further comprising:
an external terminal electrically connected to the battery; and
a protective circuit.

10. The non-aqueous electrolyte battery pack according to claim 8, comprising
a plurality of the non-aqueous electrolyte battery, wherein
the non-aqueous electrolyte batteries are electrically connected in series, electrically connected in parallel, or electrically connected in a combination of in series connection and in parallel connection.

11. The non-aqueous electrolyte battery pack according to claim 8, wherein
the positive electrode current collector of each of the one or more positive electrodes includes a third surface facing one side of the stacking direction, and a fourth surface facing a side opposite to a side where the third surface faces in the stacking direction, the first positive electrode active material layer being formed on both the third surface and the fourth surface in the positive electrode current collector of each of the one or more positive electrodes, and
the negative electrode current collector of each of the one or more negative electrodes includes a fifth surface facing one side of the stacking direction, and a sixth surface facing a side opposite to a side where the fifth surface faces in the stacking direction, the first negative electrode active material layer being formed on both the fifth surface and the sixth surface in the negative electrode current collector of each of the one or more negative electrodes.

12. The non-aqueous electrolyte battery pack according to claim 8, wherein
the non-aqueous electrolyte battery includes one or more non-aqueous electrolyte batteries,
the one or more bipolar electrodes include a plurality of bipolar electrodes in each of the one or more non-aqueous electrolyte batteries, and
at least one of the one or more positive electrodes and at least one of the one or more negative electrodes are disposed between the plurality of bipolar electrodes in each of the one or more non-aqueous electrolyte batteries.

13. The non-aqueous electrolyte battery pack according to claim 8, wherein
the non-aqueous electrolyte battery includes one or more non-aqueous electrolyte batteries,
the one or more bipolar electrodes include a plurality of bipolar electrodes in each of the one or more non-aqueous electrolyte batteries,
one of the one or more negative electrodes is stacked on the second positive electrode active material layer of each of the plurality of bipolar electrodes in each of the one or more non-aqueous electrolyte batteries, and
one of the one or more positive electrodes is stacked on the second negative electrode active material layer of each of the plurality of bipolar electrodes in each of the one or more non-aqueous electrolyte batteries.

14. The non-aqueous electrolyte battery pack according to claim 8, wherein the non-aqueous electrolyte battery includes one or more non-aqueous electrolyte batteries, the one or more bipolar electrodes include a plurality of bipolar electrodes in each of the one or more non-aqueous electrolyte batteries, at least one of the one or more positive electrodes and at least one of the one or more negative electrodes are disposed between the plurality of bipolar electrodes in each of the one or more non-aqueous electrolyte batteries, one of the one or more negative electrodes is stacked on the second positive electrode active material layer of each of the plurality of bipolar electrodes in each of the one or more non-aqueous electrolyte batteries, and one of the one or more positive electrodes is stacked on the second negative electrode active material layer of each of the plurality of bipolar electrodes in each of the one or more non-aqueous electrolyte batteries.

15. The non-aqueous electrolyte battery pack according to claim 8, wherein each of the first and second negative electrode active material layers has a reaction potential of near 1.5 V.

16. The non-aqueous electrolyte battery pack according to claim 8, wherein a negative electrode active material of each of the first and second negative electrode active material layers includes titanium-containing oxide.

17. A vehicle comprising the battery pack according to claim 8.

18. The vehicle according to claim 17, wherein the battery pack is configured to recover a regenerative energy of a power of the vehicle.

* * * * *